(12) United States Patent
Wang et al.

(10) Patent No.: US 7,052,571 B2
(45) Date of Patent: May 30, 2006

(54) ELECTROPHORETIC DISPLAY AND PROCESS FOR ITS MANUFACTURE

(75) Inventors: Xiaojia Wang, Fremont, CA (US); Jeanne Haubrich, Clifton Park, NY (US); Rong-Chang Liang, Cupertino, CA (US)

(73) Assignee: SiPix Imaging, Inc., Fremont, CA (US)

(*) Notice: Subject to any disclaimer, the term of this patent is extended or adjusted under 35 U.S.C. 154(b) by 0 days.

(21) Appl. No.: 10/845,295

(22) Filed: May 12, 2004

(65) Prior Publication Data

US 2005/0007650 A1 Jan. 13, 2005

(51) Int. Cl.
*B32B 38/14* (2006.01)
*G02B 26/00* (2006.01)
*G03G 17/04* (2006.01)

(52) U.S. Cl. .................. 156/277; 156/292; 359/296; 347/107; 432/32

(58) Field of Classification Search .................. 156/277
See application file for complete search history.

(56) References Cited

U.S. PATENT DOCUMENTS

| | | | |
|---|---|---|---|
| 3,229,607 A | 1/1966 | Battaglia |
| 3,612,758 A | 10/1971 | Evans |
| 3,668,106 A | 6/1972 | Ota |
| 3,689,346 A | 9/1972 | Rowland |
| 3,885,964 A | 5/1975 | Nacci |
| 3,892,568 A | 7/1975 | Ota et al. |
| 3,908,052 A | 9/1975 | Sanders |
| 3,928,671 A | 12/1975 | Robusto et al. |
| 4,071,430 A | 1/1978 | Liebert |
| 4,093,534 A | 6/1978 | Carter et al. |
| 4,190,352 A | 2/1980 | Bruning |
| 4,285,801 A | 8/1981 | Chiang |
| 4,298,448 A | 11/1981 | Muller et al. |
| 4,655,897 A | 4/1987 | Disanto et al. |
| 4,680,103 A | 7/1987 | Beilin et al. |
| 4,721,739 A | 1/1988 | Brenneman et al. |
| 4,732,830 A | 3/1988 | DiSanto et al. |
| 4,741,604 A | 5/1988 | Kornfeld |
| 4,741,988 A | 5/1988 | Van der Zande et al. |
| 4,881,996 A | 11/1989 | Nussbaum et al. |
| 4,891,245 A | 1/1990 | Micale |
| 4,924,257 A | 5/1990 | Jain |
| 5,177,476 A | 1/1993 | DiSanto et al. |
| 5,200,120 A | 4/1993 | Sakai |
| 5,223,106 A | 6/1993 | Gerace et al. |
| 5,274,481 A | 12/1993 | Kim |
| 5,276,438 A | 1/1994 | DiSanto et al. |
| 5,279,511 A | 1/1994 | DiSanto et al. |
| 5,285,236 A | 2/1994 | Jain |

(Continued)

FOREIGN PATENT DOCUMENTS

CA 2340683 2/2001

(Continued)

OTHER PUBLICATIONS

U.S. Appl. No. 10/284,586, filed Oct. 2002, Chen, et al.

(Continued)

*Primary Examiner*—Melvin Mayes
(74) *Attorney, Agent, or Firm*—Howrey LLP

(57) ABSTRACT

This invention relates to an electrophoretic display comprising cells of well-defined shape, size and aspect ratio, which cells are filled with charged pigment particles dispersed in a solvent, and novel processes for its manufacture.

35 Claims, 13 Drawing Sheets

U.S. PATENT DOCUMENTS

| | | |
|---|---|---|
| 5,380,362 A | 1/1995 | Schubert |
| 5,398,041 A | 3/1995 | Hyatt |
| 5,403,518 A | 4/1995 | Schubert |
| 5,432,526 A | 7/1995 | Hyatt |
| 5,450,220 A | 9/1995 | Onishi et al. |
| 5,460,688 A | 10/1995 | Disanto et al. |
| 5,480,938 A | 1/1996 | Badesha et al. |
| 5,492,963 A | 2/1996 | Ozawa et al. |
| 5,534,583 A | 7/1996 | Roberts et al. |
| 5,573,711 A | 11/1996 | Hou et al. |
| 5,589,100 A | 12/1996 | Grasso et al. |
| 5,652,645 A | 7/1997 | Jain |
| 5,699,097 A | 12/1997 | Takayama et al. |
| 5,731,860 A | 3/1998 | Harada et al. |
| 5,739,889 A | 4/1998 | Yamada et al. |
| 5,835,174 A | 11/1998 | Clikeman et al. |
| 5,843,333 A | 12/1998 | Hakemi |
| 5,872,552 A | 2/1999 | Gordon, II et al. |
| 5,877,848 A | 3/1999 | Gillette et al. |
| 5,878,066 A | 3/1999 | Mizutani et al. |
| 5,895,541 A | 4/1999 | Kobayashi et al. |
| 5,914,806 A | 6/1999 | Gordon, II et al. |
| 5,930,026 A | 7/1999 | Jacobson et al. |
| 5,942,154 A | 8/1999 | Kim et al. |
| 5,943,113 A | 8/1999 | Ichihasi |
| 5,956,112 A | 9/1999 | Fujimori et al. |
| 5,961,804 A | 10/1999 | Jacobson et al. |
| 5,967,871 A | 10/1999 | Kaake et al. |
| 5,976,405 A | 11/1999 | Clikeman et al. |
| 5,978,062 A | 11/1999 | Liang et al. |
| 5,985,084 A | 11/1999 | Summersgill et al. |
| 5,995,190 A | 11/1999 | Nagae et al. |
| 6,017,584 A | 1/2000 | Albert et al. |
| 6,018,383 A | 1/2000 | Dunn et al. |
| 6,037,058 A | 3/2000 | Clikeman et al. |
| 6,046,539 A | 4/2000 | Haven et al. |
| 6,064,508 A | 5/2000 | Forgette et al. |
| 6,067,185 A | 5/2000 | Albert et al. |
| 6,113,810 A | 9/2000 | Hou et al. |
| 6,113,836 A | 9/2000 | Sakai et al. |
| 6,120,588 A | 9/2000 | Jacobson |
| 6,120,839 A | 9/2000 | Comiskey et al. |
| 6,120,946 A | 9/2000 | Johnson et al. |
| 6,166,797 A | 12/2000 | Bruzzone et al. |
| 6,172,798 B1 | 1/2001 | Albert et al. |
| 6,184,856 B1 | 2/2001 | Gordon, II et al. |
| 6,191,250 B1 | 2/2001 | Aida et al. |
| 6,239,896 B1 | 5/2001 | Ikeda |
| 6,274,284 B1 | 8/2001 | Aylward et al. |
| 6,294,257 B1 | 9/2001 | Tsukakoshi et al. |
| 6,312,304 B1 | 11/2001 | Duthaler et al. |
| 6,319,381 B1 | 11/2001 | Nemelka |
| 6,327,072 B1 | 12/2001 | Comiskey et al. |
| 6,337,358 B1 | 1/2002 | Whitehouse et al. |
| 6,337,761 B1 | 1/2002 | Rogers et al. |
| 6,356,376 B1 | 3/2002 | Tonar et al. |
| 6,361,830 B1 | 3/2002 | Schenk et al. |
| 6,392,785 B1 | 5/2002 | Albert et al. |
| 6,392,786 B1 | 5/2002 | Albert |
| 6,400,430 B1 | 6/2002 | Nakao et al. |
| 6,400,492 B1 | 6/2002 | Morita et al. |
| 6,512,626 B1 | 1/2003 | Schmidt |
| 6,514,328 B1 | 2/2003 | Katoh et al. |
| 6,524,153 B1 | 2/2003 | Ikeda et al. |
| 6,525,865 B1 | 2/2003 | Katase |
| 6,545,797 B1 | 4/2003 | Chen et al. |
| 6,636,341 B1 * | 10/2003 | Kanbe ..................... 359/296 |
| 6,652,075 B1 | 11/2003 | Jacobson |
| 6,672,921 B1 | 1/2004 | Liang et al. |
| 6,751,007 B1 | 6/2004 | Liang et al. |
| 6,788,449 B1 | 9/2004 | Liang et al. |
| 6,788,452 B1 | 9/2004 | Chen et al. |
| 6,795,138 B1 | 9/2004 | Liang et al. |
| 6,795,229 B1 | 9/2004 | Liang et al. |
| 6,821,799 B1 | 11/2004 | Steckl et al. |
| 6,831,770 B1 | 12/2004 | Liang et al. |
| 6,833,177 B1 | 12/2004 | Chen et al. |
| 6,833,943 B1 | 12/2004 | Liang et al. |
| 6,850,355 B1 | 2/2005 | Liang et al. |
| 6,859,302 B1 | 2/2005 | Liang et al. |
| 6,862,128 B1 * | 3/2005 | Katase ..................... 359/296 |
| 6,885,495 B1 * | 4/2005 | Liang et al. ............ 359/296 |
| 2001/0009352 A1 | 7/2001 | Moore |
| 2002/0008898 A1 * | 1/2002 | Katase ..................... 359/296 |
| 2002/0018043 A1 | 2/2002 | Nakanishi |
| 2002/0029969 A1 | 3/2002 | Yager et al. |
| 2002/0166771 A1 * | 11/2002 | Kanbe ..................... 204/600 |
| 2002/0182544 A1 * | 12/2002 | Chan-Park et al. ........ 430/311 |
| 2002/0188053 A1 | 12/2002 | Zang et al. |
| 2003/0063370 A1 | 4/2003 | Chen et al. |
| 2003/0197916 A1 | 10/2003 | Chung et al. |
| 2005/0133154 A1 * | 6/2005 | Daniel et al. ............. 156/292 |

FOREIGN PATENT DOCUMENTS

| | | |
|---|---|---|
| DE | 199 27 359.6 | 12/2000 |
| EP | 0 990 942 | 4/2000 |
| EP | 1 065 553 | 1/2001 |
| EP | 1 089 118 | 4/2001 |
| EP | 1 195 603 | 4/2002 |
| GB | 1 313 412 | 4/1973 |
| JP | 57-104116 | 6/1982 |
| JP | 59-034518 | 2/1984 |
| JP | 59-171930 | 9/1984 |
| JP | 60-205452 | 10/1985 |
| JP | 62-099727 | 5/1987 |
| JP | 62-203123 | 9/1987 |
| JP | 64-86116 | 3/1989 |
| JP | 01-300232 | 12/1989 |
| JP | 02-223936 | 9/1990 |
| JP | 02223934 | 9/1990 |
| JP | 02284125 | 11/1990 |
| JP | 02284126 | 11/1990 |
| JP | 04-113386 | 4/1992 |
| JP | 04-307523 | 10/1992 |
| JP | 06-242423 | 9/1994 |
| JP | 09-190052 | 6/1997 |
| JP | 2000 035677 | 2/2000 |
| JP | 2000 075497 | 3/2000 |
| JP | 2001 042118 | 2/2001 |
| JP | 2001 056653 | 2/2001 |
| WO | WO 97/04398 | 2/1997 |
| WO | WO 98/57226 | 12/1998 |
| WO | WO 99/08151 | 2/1999 |
| WO | WO 99/53373 | 10/1999 |
| WO | WO 99/56171 | 11/1999 |
| WO | WO 00/03291 | 1/2000 |
| WO | WO 00/36649 | 6/2000 |
| WO | WO 00/60410 | 10/2000 |
| WO | WO 00/77571 | 12/2000 |
| WO | WO 01/67170 | 9/2001 |
| WO | WO 02/01280 | 1/2002 |
| WO | WO 02/001281 | 1/2002 |
| WO | WO 02/056097 | 7/2002 |
| WO | WO 03/081325 | 10/2003 |
| WO | PCT/US04/05450 | 11/2004 |

OTHER PUBLICATIONS

U.S. Appl. No. 10/335,051, filed Dec. 2002, Chen, et al.
U.S. Appl. No. 10/335,210, filed Dec. 2002, Chen, et al.
U.S. Appl. No. 10/632,171, filed Jul. 2003, Yu, et al.
U.S. Appl. No. 10/683,869, filed Oct. 2003, Hou, et al.
U.S. Appl. No. 10/686,501, filed Oct. 2003, Feng, et al.

U.S. Appl. No. 60/517,520, filed Nov. 2003, Hwang, et al.
U.S. Appl. No. 60/517,719, filed Nov. 2003, Gu, et al.
Chaug, Y.S., Haubrich, J.E., Sereda, M. and Liang, R.C. (Apr. 2004). Roll-to-Roll Processes for the Manufacturing of Patterned Conductive Electrodes on Flexible Substrates. *Mat. Res. Soc. Symp. Proc.,* vol. 814, 19.6.1.
Chung, J., Hou, J., Wang, W., Chu, L.Y., Yao, W., & Liang, R.C. (Dec. 2003). Microcup(R) Electrophoretic Displays, Grayscale and Color Rendition. *IDW,* AMD2/EP1-2, 243-246.
Ho,C.,& Liang, R.C. (Dec. 2003). *Microcup (R) Electronic Paper by Roll-to-Roll Manufacturing Processes.* Presentation conducted at FEG, Nei-Li, Taiwan.
Liang, R.C. (Apr. 2004). *Microcup Electronic Paper by Roll-to-Roll Manufacturing Process.* Presentation at the Flexible Displays & Electronics 2004 of Intertech, San Francisco, California, USA.
Wang, X., Kiluk, S., Chang, C., Wu, Y., & Liang, R.C. (Feb. 2004). Microcup (R) Electronic Paper and the Converting Processes. *ASID,* 10.1.2-26, 396-399, Nanjing, China.
Zang, H.M, Hwang, J.J., Gu, H., Hou, J., Weng, X., Chen, Y., et al. (Jan. 2004). Threshold and Grayscale Stability of Microcup (R) Electronic Paper. *Proceeding of SPIE-IS&T Electronic Imaging, SPIE* vol. 5289, 102-108.
Zang, H.M. (Feb. 2004). *Microcup Electronic Paper.* Presentation conducted at the Displays & Microelectronics Conference of U.S. Display Consortium, Phoenix, Arizona, USA.
Zang, H.M. (Oct. 2003). *Microcup (R) Electronic Paper by Roll-to-Roll Manufacturing Processes.* Presentation conducted at the Advisory Board Meeting, Bowling Green State University, Ohio, USA.
Allen, K. (Oct. 2003). Electrophoretics Fulfilled. *Emerging Displays Review: Emerging Display Technologies, Monthly Report—Octomber 2003,* 9-14.
Bryning et al., "37.4: Reverse-Emulsion Electrophoretic Display (REED)" *SID 98 Digest* pp. 1018-1021 (1998).
Chen, S.M. (Jul. 2003) The Applications for the Revolutionary Electronic Paper Technology. *OPTO News & Letters,* 102, 37-41. (in Chinese, English abstract attached, full translation available upon request).
Chen, S.M. (May 2003) The New Applications and the Dynamics of Companies. *TRI.* 1-10. In Chinese, English abstract attached, full translation available upon request).
Comiskey et al, "An Electrophoretic Ink for All-printed Reflective Electronic Displays", Letters to Nature, MIT, The Media Laboratory, 20 Ames Street, Cambridge, MA 02139-4307, USA, May 1998, pp.-253-255.
Dalisa, A. L., "Electrophoretic Display Technology", IEEE Trans. Electron Devices, pp.-827-834 (1977).
Drzaic, P.S., "Liquid Crystal Dispersions", The PDLC Paradigm, pp. 1-9, (1995).
Harbour, J. R., "Subdivided Electrophoretic Display" Xerox Disclosure Journal, US Xerox Corporation, Stamford, Conn., 4(6):705, Nov. 1979, XP002123212.
Harvey, T.G., "Replication Techniques for Micro-optics", SPIE Proc., vol. 3099, pp.-76-82 (1997).
Hopper, M.A. et al., "An Electrophoretic Display, its Properties, Model and Addressing", IEEE Trans. Electr. Dev., 26/8 pp. 1148-1152 (1979).
Inoue, S. et al., "High Resolution Microencapsulated Electrophoretic Display (EPD) Driven by Poly-Si TFTs With Four-Level Grayscale" *IEEE Transactions on Electron Devices* 49(8), pp.-1532-1539 (2002).
Kazlas, P. et al., "12.1: 12.1" SVGA Microencapsulated Electorphoretic Active Matrix Display for Information Appliances *SID 01 Digest* 152-155 (2001).
Kishi, E et al, "5.1 Development of In-Plane EPD", Canon Research Center, SID 00 Digest, pp.-24-27.
Lee, H., & Liang, R.C. (Jun. 2003) SiPix Microcup(R) Electronic Paper—An Introduction. *Advanced Display,* Issue 37, 4-9 (in Chinese, English abstract attached, full translation available upon request).
Lewis, J.C., "Electrophoretic Displays", Allen Clark Research Centre, The Plessey Company Ltd., Caswell, Towcester, Northants, England, pp.-223-240.
Liang, R.C. (Feb. 2003) *Microcup(R) Electrophoretic and Liquid Crystal Displays by Roll-to-Roll Manufacturing Processes.* Presentation conducted at the Flexible Microelectronics & Displays Conference of U.S. Display Consortium, Phoenix, Arizona, USA.
Liang, R.C., Hou, J., Chung, J., Wang, X., Pereira, C., & Chen, Y. (2003). Microcup(R) Active and Passive Matrix Electrophoretic Displays by a Roll-to-Roll Manufacturing Processes. *SID Digest,* 20.1.
Liang, R.C., Hou, J., & Zang, H.M. (Dec. 2002) Microcup Electrophoretic Displays by Roll-to-Roll Manufacturing Processes. *IDW,* EP2-2, 1337-1340.
Liang, R.C., Hou, J., Zang, H.M., & Chung, J. (Feb. 2003). *Passive Matrix Microcup(R) Electrophoretic Displays.* Paper presented at the IDMC, Taipei, Taiwan.
Liang, R.C., Hou, J., Zang, H.M., Chung, J., & Tseng, S. (2003). Microcup(R) displays: Electronic Paper by Roll-to-Roll Manufacturing Processes. *Journal of the SID,* 11(4), 621-628.
Liang, R.C., & Tseng, S. (Feb. 2003). *Microcup(R) LCD, An New Type of Dispersed LCD by a Roll-to-Roll Manufacturing Process.* Paper presented at the IDMC, Taipei, Taiwan.
Matsuda Y. "Newly designed, high resolution, active matrix addressing in plane EPD" *IDW 02 EP2-3* 1341-1344 (2002).
Murau and Singer, "The Understanding and Elimination of Some Suspension Instabilities in an Electrophoretic Displa"., J. Appl. Phys. 49(9), pp.-4820-4829, 1978.
Nakamura, et al, "Development of Electrophoretic Display using Microencapusulated Suspension", NOK Corporation, Kanagawa, Japan & NOK Corporation, Ibaraki, Japan, SID 98 Digest, pp.-1014-1017.
Nikkei Microdevices. (Dec. 2002) Newly-Developed Color Electronic Paper Promises—Unbeatable Production Efficiency. *Nikkei Microdevices, 3.* (in Japanese, with English translation).
Ota et al., "Developments in Electrophoretic Displays" *Proc. of SID,* vol. 18/3&4, pp.-243-254 (1977).
Ota, et al., "Electrophoretic Image Display (EPID) Panel", *Proceedings of the IEEE,* pp.-832-836, Jul. 1973.
Singer, B. et al., "X-Y Addressable Electrophoretic Display", Proc. SID 18(3/4), pp.-255-266 (1977).
Slafer, W. D. et al, "Continuous Manufacturing of Thin Cover Sheet Optical Media", SPIE Proc., vol. 1663, pp.-324-335 (1992).
Swanson et al., "5.2: High Performance Electrophoretic Displays" *SID 00 Diges,* pp.-29-31 (2000).
Zang, H.M., & Liang, R.C. (2003) Microcup Electronic Paper by Roll-to-Roll Manufacturing Processes. *The Spectrum,* 16(2), 16-21.

* cited by examiner

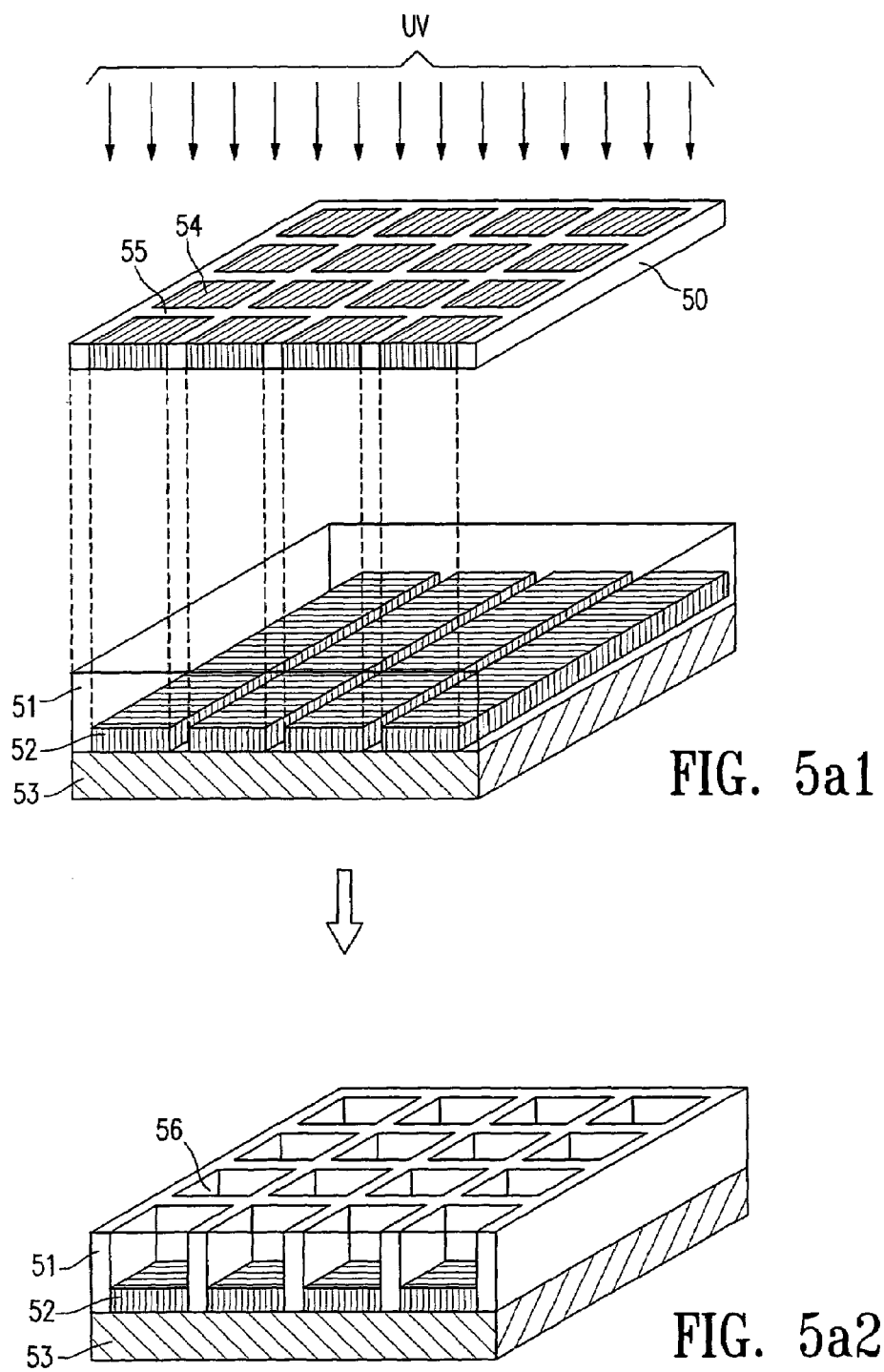
FIG. 5a1
FIG. 5a2

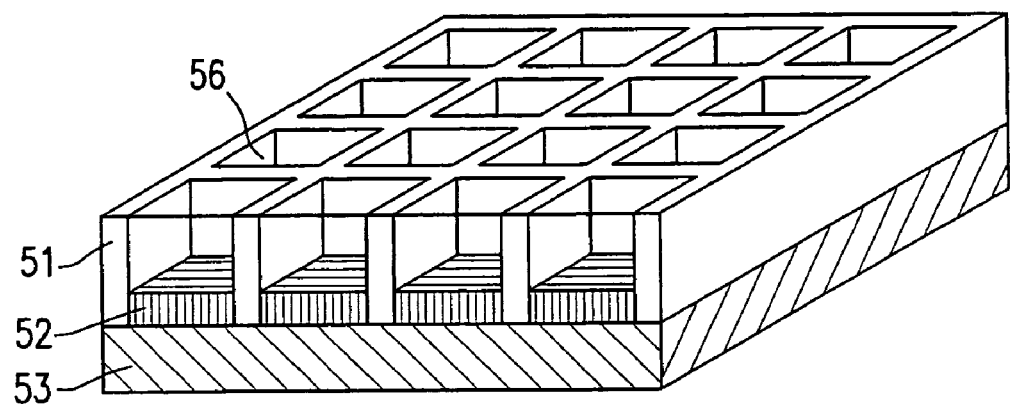
FIG. 5b2
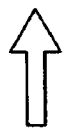
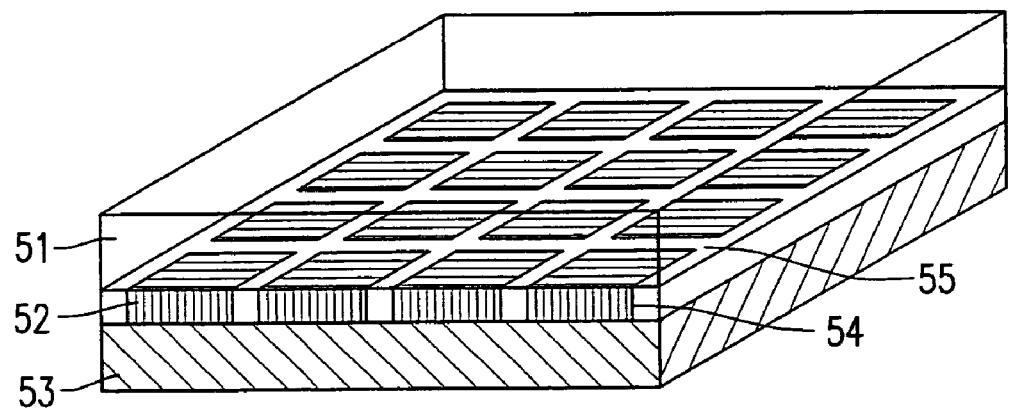
FIG. 5b1

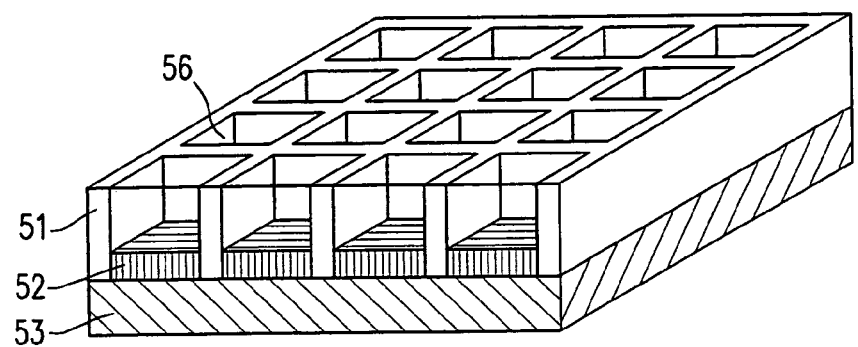
FIG. 5c2
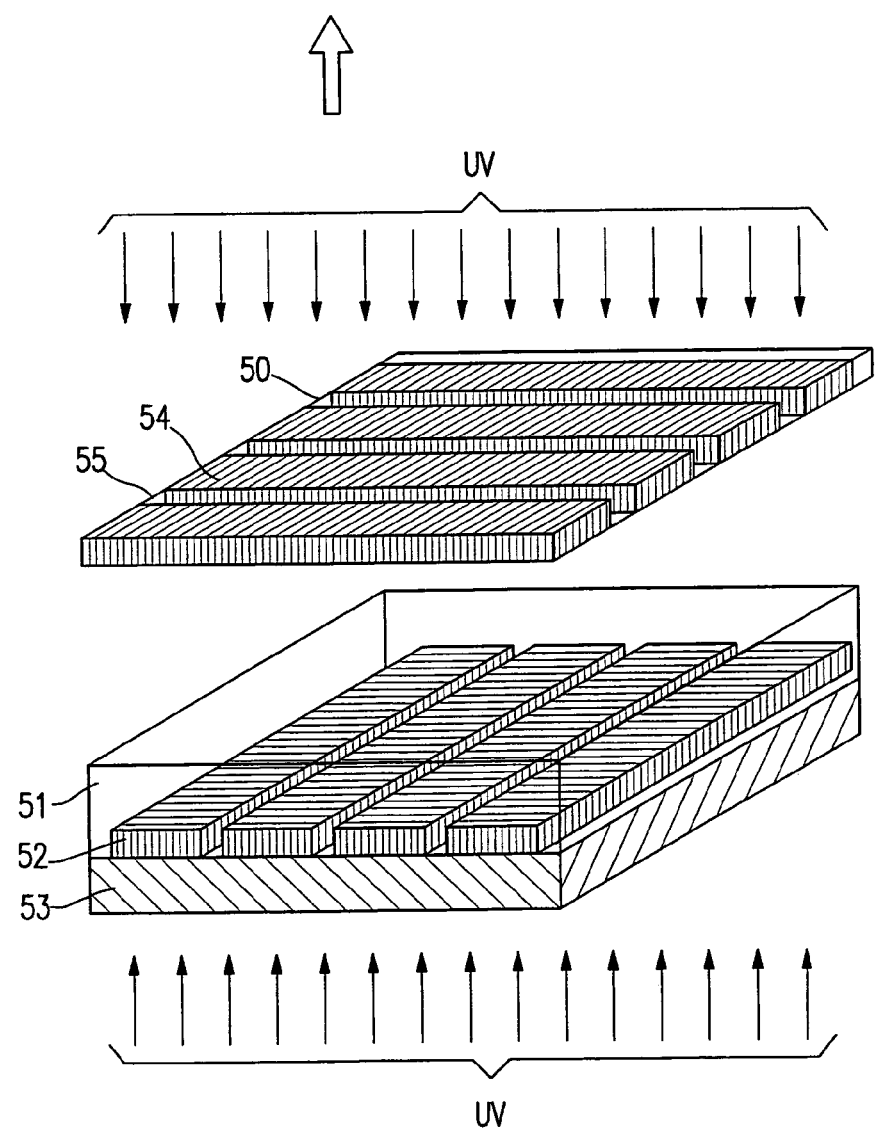
FIG. 5c1

ELECTROPHORETIC DISPLAY AND PROCESS FOR ITS MANUFACTURE

RELATED APPLICATION

This application is related to U.S. application Ser. No. 09/518,488, which is now U.S. Pat. No. 6,930,818, U.S. application Ser. No. 10/284,586, which is now U.S. Pat. No. 6,972,893, and U.S. application Ser. No. 09/879,408, which is now U.S. Pat. No. 6,545,797, the contents of all of which are incorporated herein by reference in their entirety.

BACKGROUND OF THE INVENTION a) Field of the Invention

This invention relates to an electrophoretic display comprising cells of well-defined shape, size and aspect ratio, which cells are filled with charged pigment particles dispersed in a solvent, and novel processes for its manufacture.

b) Description of Related Art

The electrophoretic display is a non-emissive device based on the electrophoresis phenomenon of charged pigment particles suspended in a solvent. It was first proposed in 1969. The display usually comprises two plates with electrodes placed opposing each other, separated by using spacers. One of the electrodes is usually transparent. A suspension composed of a colored solvent and charged pigment particles is enclosed between the two plates. When a voltage difference is imposed between the two electrodes, the pigment particles migrate to one side or the other and then either the color of the pigment or the color of the solvent can be seen according to the polarity of the voltage difference.

In order to prevent undesired movement of the particles, such as sedimentation, partitions between the two electrodes were proposed for dividing the space into smaller cells. However, in the case of partition-type electrophoretic displays, some difficulties were encountered in the formation of the partitions and the process of enclosing the suspension. Furthermore, it was also difficult to keep suspensions of different colors separate from each other in the partition-type electrophoretic display.

Subsequently, attempts were made to enclose the suspension in microcapsules. U.S. Pat. Nos. 5,961,804 and 5,930,026 describe microencapsulated electrophoretic displays. The microcapsule-type display has a substantially two dimensional arrangement of microcapsules each having therein an electrophoretic composition of a dielectric solvent and a suspension of charged pigment particles that visually contrast with the dielectric solvent. The microcapsules can be formed by interfacial polymerization, in-situ polymerization or other known methods such as physical processes, in-liquid curing or simple/complex coacervation. The microcapsules, after their formation, may be injected into a cell housing two spaced-apart electrodes, or "printed" into or coated on a transparent conductor film. The microcapsules may also be immobilized within a transparent matrix or binder that is itself sandwiched between the two electrodes.

The electrophoretic displays prepared by these prior art processes, in particular, the microencapsulation process as disclosed in U.S. Pat. Nos. 5,930,026, 5,961,804, and 6,017,584, have many shortcomings. For example, the electrophoretic display manufactured by the microencapsulation process suffers from sensitivity to environmental changes (in particular, sensitivity to moisture and temperature) due to the wall chemistry of the microcapsules. Secondly, the electrophoretic display based on the microcapsules has poor scratch resistance due to the thin wall and large particle size of the microcapsules. To improve the handleability of the display, microcapsules are embedded in a large quantity of polymer matrix which results in a slow response time due to the large distance between the two electrodes and a low contrast ratio due to the low payload of pigment particles. It is also difficult to increase the surface charge density on the pigment particles because charge-controlling agents tend to diffuse to the water/oil interface during the microencapsulation process. The low charge density or zeta potential of the pigment particles in the microcapsules also results in a slow response rate. Furthermore, because of the large particle size and broad size distribution of the microcapsules, the prior art electrophoretic display of this type has poor resolution and addressability for color applications.

SUMMARY OF THE INVENTION

The first aspect of the present invention is directed to an electrophoretic display comprising cells of well-defined shape, size and aspect ratio. The cells are filled with charged pigment particles dispersed in a dielectric solvent or solvent mixture.

Another aspect of the invention relates to a novel process for the manufacture of such an electrophoretic display.

A further aspect of the invention relates to the preparation of cells of well-defined shape, size and aspect ratio. The cells enclose a suspension of charged pigment particles dispersed in a dielectric solvent and are formed from microcups prepared according to the present invention. Briefly, the process for the preparation of the microcups involves embossing a thermoplastic or thermoset precursor layer coated on a conductor film with a pre-patterned male mold, followed by releasing the mold during or after the thermoplastic or thermoset precursor layer is hardened by radiation, cooling, solvent evaporation, or other means. Alternatively, the microcups may be formed from imagewise exposure of the conductor film coated with a radiation curable material followed by removing the unexposed areas after the exposed areas have become hardened.

Solvent-resistant, thermomechanically stable microcups having a wide range of size, shape, and opening ratio can be prepared by either one of the aforesaid methods. The microcups are then filled with a suspension of charged pigment particles dispersed in a dielectric solvent, and sealed.

Yet another aspect of the present invention relates to the sealing of the microcups filled with the electrophoretic fluid containing a dispersion of charged pigment particles in a dielectric fluid. Sealing can be accomplished by a variety of ways. Preferably, it is accomplished by dispersing a thermoplastic or thermoset precursor in the electrophoretic fluid before the filling step. The thermoplastic or thermoset precursor is immiscible with the dielectric solvent and has a specific gravity lower than that of the solvent and the pigment particles. After filling, the thermoplastic or thermoset precursor phase separates from the electrophoretic fluid and forms a supernatant layer at the top of the fluid. The sealing of the microcups is then conveniently accomplished by hardening the thermoplastic or thermoset precursor layer by solvent evaporation, interfacial reaction, moisture, heat, or radiation. UV radiation is the preferred method to seal the microcups, although a combination of two or more curing mechanisms as described above may be used to increase the throughput of sealing. Alternatively, the sealing can be accomplished by overcoating the electrophoretic fluid with a solution containing the thermoplastic or thermoset precursor. The sealing is then accomplished by hardening the thermoplastic or thermoset precursor by solvent evaporation, interfacial reaction, moisture, heat, radiation, or a combination of curing mechanisms. These sealing processes are especially unique features of the present invention.

Yet another aspect of the present invention relates to a multiple step process for the manufacture of a monochrome electrophoretic display comprising cells having well-defined shape and size. The processing steps include preparation of the microcups by any one of the methods described above, sealing of the microcups, and finally laminating the sealed array of microcups with a second conductor film pre-coated with an adhesive layer. This multiple-step process can be carried out roll to roll continuously.

Yet another aspect of the present invention relates to a process for the manufacture of a full color electrophoretic display by laminating the preformed microcups with a layer of positively working photoresist, selectively opening a certain number of the microcups by imagewise exposing the positive photoresist, followed by developing the photoresist, filling the opened microcups with a colored electrophoretic fluid, and sealing the filled microcups by a sealing process. These steps may be repeated to create sealed microcups filled with electrophoretic fluids of different colors.

Yet another aspect of the present invention relates to an alternative process for the manufacture of a full color electrophoretic display involving adding colorant solutions or dispersions of different colors and charged pigment particles in separate steps. More specifically, the process comprises the steps of pattern-wise filling colorant solutions or dispersions into microcups in predetermined areas, followed by pattern-wise or non-pattern-wise adding an electrophoretic fluid comprising charged pigment (e.g., $TiO_2$ or other white or colored pigments) particles dispersed in a dielectric solvent or solvent mixture into the microcups which have been pre-filled with the colorant solutions or dispersions. The thus filled microcups are then top-sealed by one of the sealing processes as described in the present application.

The colorant solutions or dispersions may be solutions or dispersions of different colors (e.g., red, green and blue) or solutions or dispersions of the same color but having different optical densities or concentrations. The colorants may be dissolved or dispersed in a solvent different from the dielectric solvent in which the charged pigment particles are dispersed. Optionally, the solvent in the colorant solutions or dispersions may be dried off before the subsequent step of filling the electrophoretic fluid.

Yet still another aspect of the present invention relates to another process for the manufacture of an electrophoretic display comprising microcups filled with electrophoretic fluids of different electrophoretic characteristics, such as switching rate, threshold voltage, gamma and/or clearing voltage. The process comprises the steps of pattern-wise filling microcups with additive solutions or dispersions providing the various characteristics and pattern-wise or non-pattern-wise adding an electrophoretic fluid comprising charged pigment (e.g., $TiO_2$ or other white or colored pigments) particles dispersed in a dielectric solvent or solvent mixture into the microcups which have been pre-filled with the additive solutions or dispersions. The thus filled microcups are then top-sealed by one of the sealing processes as described in this application. Useful additives for the present invention may include, but are not limited to, surfactants, protective colloids, polymers, viscosity modifiers, charge controlling agents, stabilizers, antioxidants, fluorescent materials, fillers and filler particles.

The additive(s) may be dissolved or dispersed in a solvent different from the dielectric solvent in which the charged pigment particles are dispersed. Optionally, the solvent of the additive solutions or dispersions may be dried off before the subsequent step of filling the electrophoretic fluid.

These multiple-step processes as disclosed may be carried out roll-to-roll continuously or semi-continuously. Consequently, they are suitable for high volume and low cost production. These processes are also efficient and inexpensive as compared to other processes for high volume production operations. The electrophoretic display prepared according to the present invention is not sensitive to environment, particularly humidity and temperature. The display is thin, flexible, durable, easy-to-handle, and format-flexible. Since the electrophoretic display prepared according to the present invention comprises cells of favorable aspect ratio and well-defined shape and size, the bistable reflective display has excellent color addressability, high contrast ratio, and fast switching rate. The drawbacks of electrophoretic displays prepared by the prior art processes are therefore all eliminated.

BRIEF DESCRIPTION OF THE DRAWINGS

FIGS. 5a–5c show alternative processing steps for preparing the microcups involving imagewise exposure of a conductor film coated with a radiation curable material.

DETAILED DESCRIPTION OF THE INVENTION

Definitions

Unless defined otherwise in this specification, all technical terms are used herein according to their conventional definitions as they are commonly used and understood by those of ordinary skill in the art.

The term "microcup" refers to the cup-like indentations created by microembossing or imagewise exposure.

The term "cell", in the context of the present invention, is intended to mean the single unit formed from a sealed microcup. The cells are filled with charged pigment particles dispersed in a dielectric solvent or solvent mixture.

The term "well-defined", when describing the microcups or cells, is intended to indicate that the microcup or cell has a definite shape, size and aspect ratio which are pre-determined according to the specific parameters of the manufacturing process.

The term "aspect ratio" is a commonly known term in the art of electrophoretic displays. In this application, it refers to the depth to width or depth to length ratio of the microcups.

PREFERRED EMBODIMENTS

Figure 1:
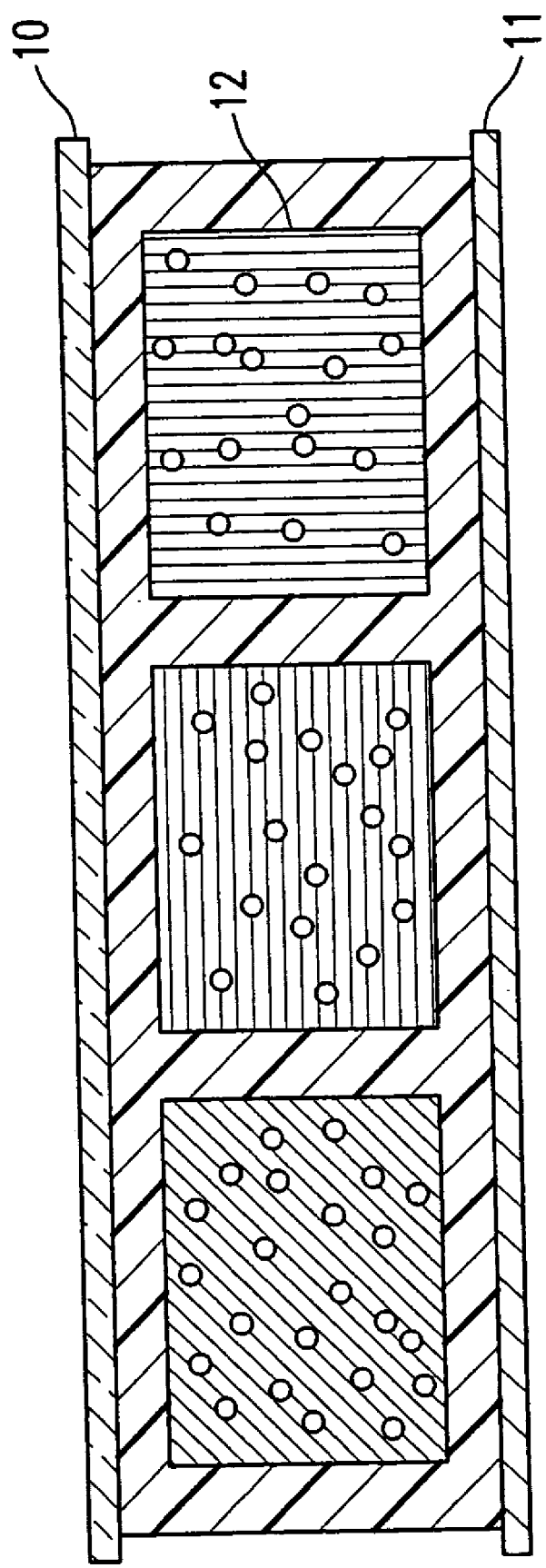
FIG. 1 is a schematic depiction of the electrophoretic display of the present invention.

An electrophoretic display of the present invention, as shown in FIG. 1, comprises two electrode plates (10, 11), at least one of which is transparent (10), and a layer of well-defined cells (12) enclosed between the two electrodes. The cells are of well-defined shape and size filled with charged pigment particles dispersed in a dielectric solvent and sealed with a sealing layer (not shown). When a voltage difference is imposed between the two electrodes, the charged particles migrate to one side, such that either the color of the pigment or the color of the solvent is seen through the transparent conductor film. At least one of the two conductors is patterned. The process for the preparation of such an electrophoretic display involves several aspects.

I. Preparation of the Microcups

I(a) Preparation of the Microcups by Embossing

Figure 2A:
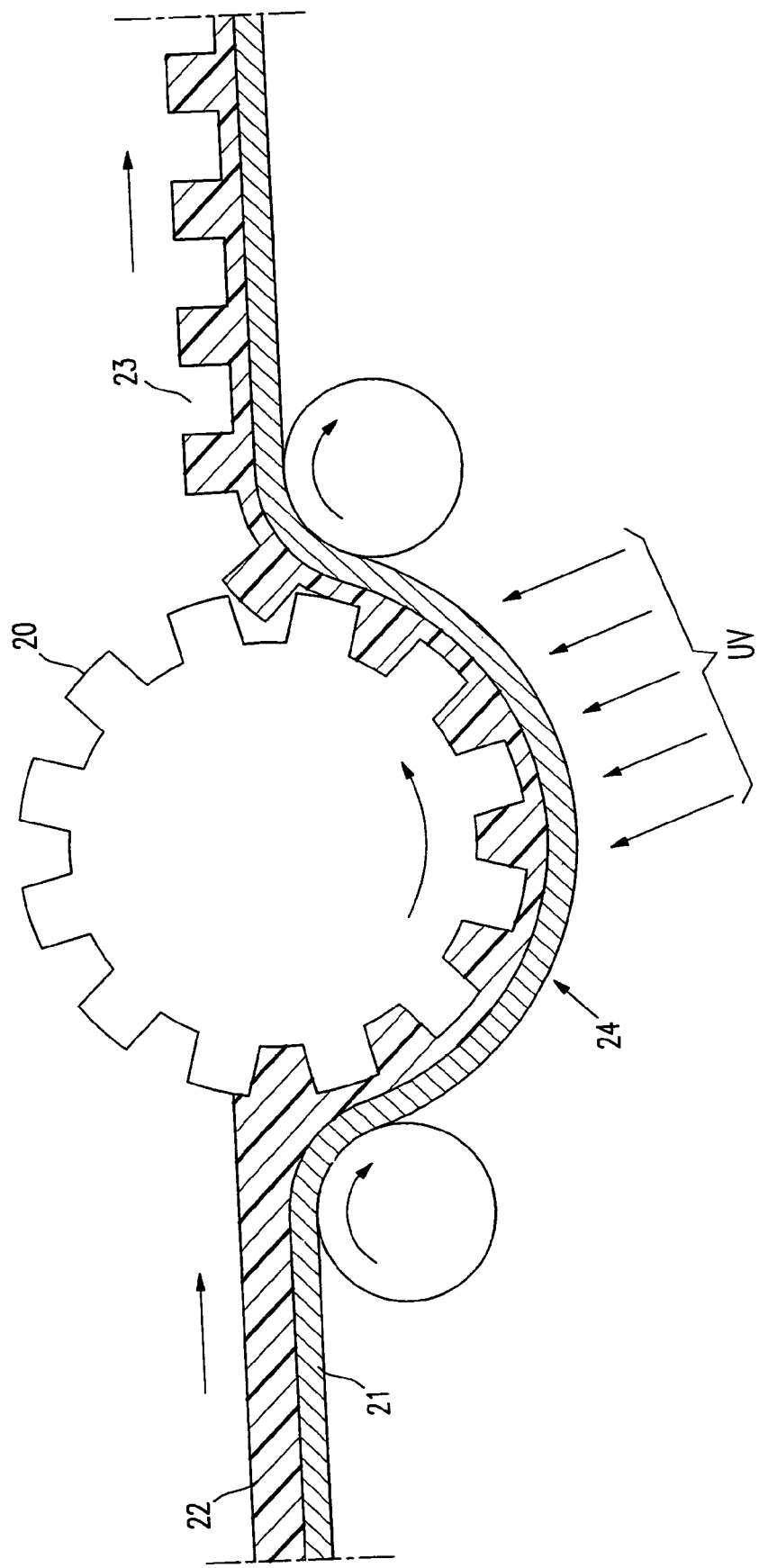
FIGS. 2a and 2b show a roll to roll process for the manufacture of an electrophoretic display, in particular, the creation of microcups by embossing a conductor film coated with a UV curable composition.
Figure 2B:
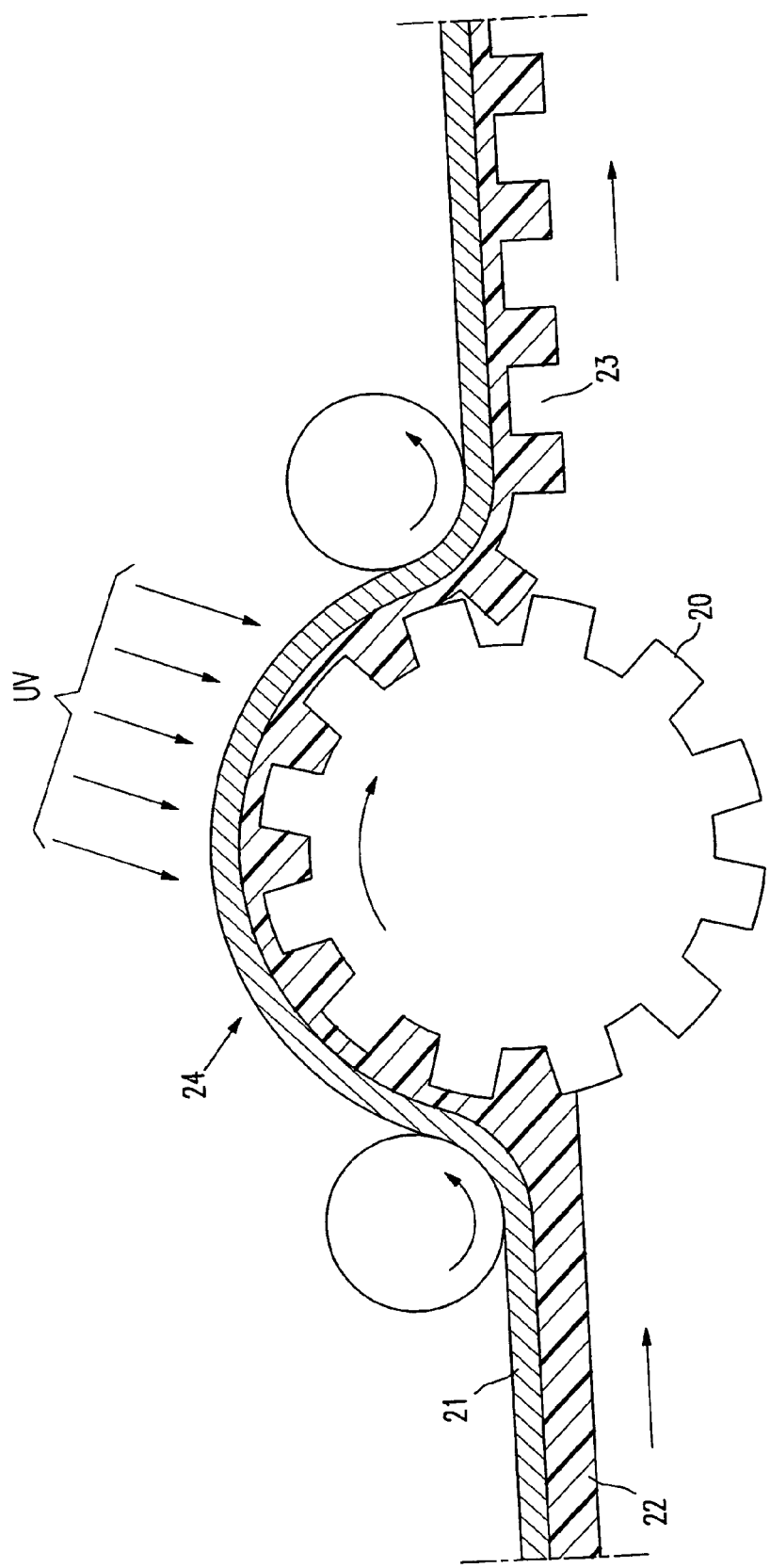

This processing step is shown in FIGS. 2a and 2b. The male mold (20) may be placed either above (FIG. 2a) or below (FIG. 2b) the web (24). The transparent conductive substrate is constructed by forming a transparent conductor film (21) on a glass plate or a plastic substrate. A layer of a thermoplastic or thermoset precursor (22) is then coated on the conductor film. The thermoplastic or thermoset precursor layer is embossed at a temperature higher than the glass transition temperature of the thermoplastic or thermoset precursor layer by the male mold in the form of a roller, plate or belt.

The thermoplastic or thermoset precursor for the preparation of the microcups may be multifunctional acrylate or methacrylate, vinylether, epoxide and their oligomers or polymers, or the like. Multifunctional acrylate and the oligomers thereof are the most preferred. A combination of a multifunctional epoxide and a multifunctional acrylate is also very useful to achieve desirable physico-mechanical properties. A crosslinkable oligomer imparting flexibility, such as urethane acrylate or polyester acrylate, is usually also added to improve the flexure resistance of the embossed microcups. The composition may contain polymer, oligomer, monomer and additives or only oligomer, monomer and additives. The glass transition temperatures (or Tg) for this class of materials usually range from about −70° C. to about 150° C., preferably from about −20° C. to about 50° C. The microembossing process is typically carried out at a temperature higher than the Tg. A heated male mold or a heated housing substrate against which the mold presses may be used to control the microembossing temperature and pressure.

As shown in FIGS. 2a and 2b, the mold is released during or after the precursor layer is hardened to reveal an array of microcups (23). The hardening of the precursor layer may be accomplished by cooling, cross-linking by radiation, heat or moisture. If the curing of the thermoplastic or thermoset precursor is accomplished by UV radiation, UV may radiate onto the transparent conductor film from the bottom or the top of the web as shown in the two figures. Alternatively, UV lamps may be placed inside the mold. In this case, the mold must be transparent to allow the UV light to radiate through the pre-patterned male mold on to the thermoplastic or thermoset precursor layer.

Preparation of the Male Mold

Figure 3A:
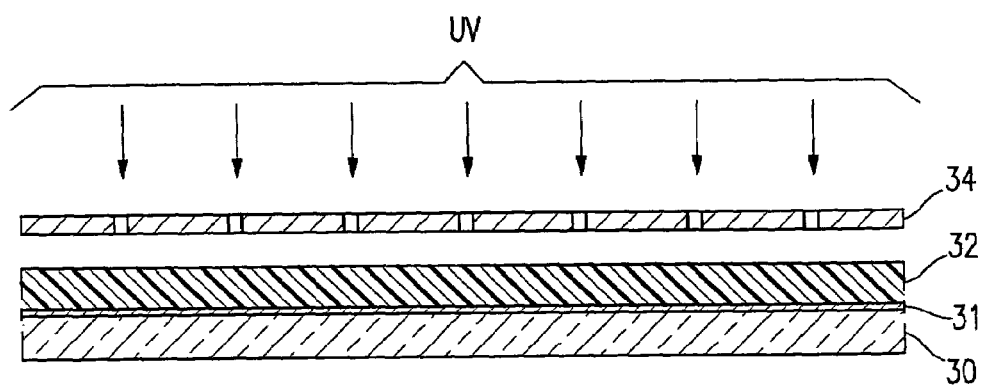
FIGS. 3a–3d illustrate a typical method of preparing the male mold for microembossing.
Figure 3B:
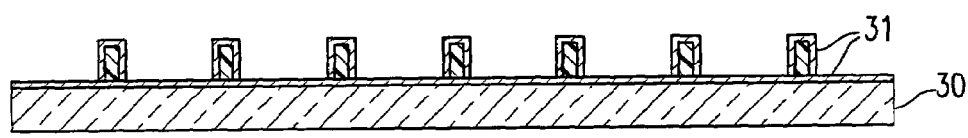
Figure 3C:
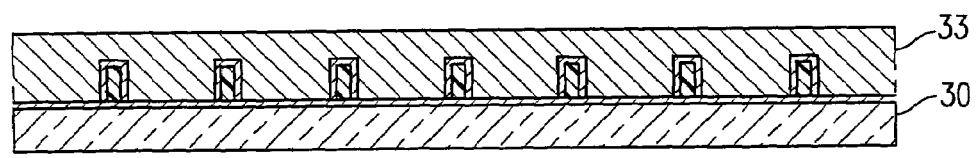
Figure 3D:
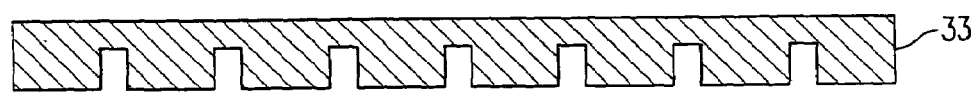

The male mold may be prepared by a photoresist process followed by either etching or electroplating. A representative example for the preparation of the male mold is given in FIG. 3. With electroplating (FIG. 3a), a glass base (30) is sputtered with a thin layer (typically 3000 Å) of a seed metal (31) such as chrome inconel. It is then coated with a layer of photoresist (32) and exposed to UV. A mask (34) is placed between the UV and the layer of photoresist (32). The exposed areas of the photoresist become hardened. The unexposed areas are then removed by washing them with an appropriate solvent. The remaining hardened photoresist is dried and sputtered again with a thin layer of seed metal. A master (FIG. 3b) is then ready for electroforming. A typical material used for electroforming is nickel cobalt (33). Alternatively, the master can be made of nickel by nickel sulfamate electroforming or electroless nickel deposition as described in "Continuous Manufacturing of Thin Cover Sheet Optical Media", SPIE Proc. Vol. 1663, pp.324 (1992). The floor of the mold (FIG. 3d) is typically between 50 to 400 microns. The master can also be made using other microengineering techniques including e-beam writing, dry etching, chemical etching, laser writing or laser interference as described in "Replication Techniques for Micro-optics", SPIE Proc. Vol.3099, pp76–82 (1997). Alternatively, the mold can be made by photomachining using plastics, ceramics or metals.

Figure 4B:
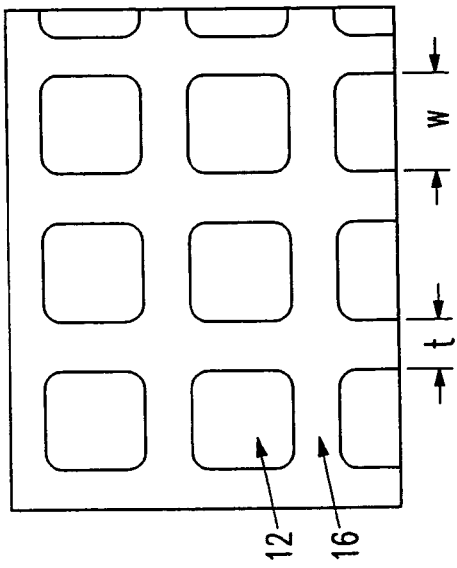
FIGS. 4a–4c show a typical microcup array prepared by microembossing.
Figure 4A:
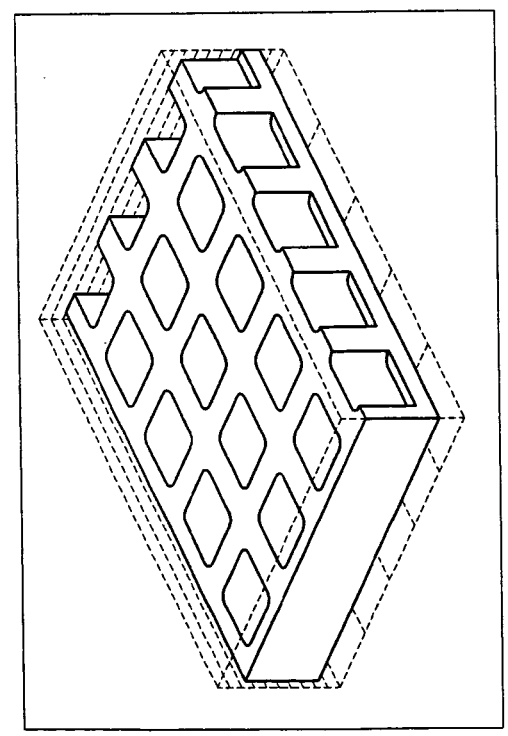
Figure 4C:
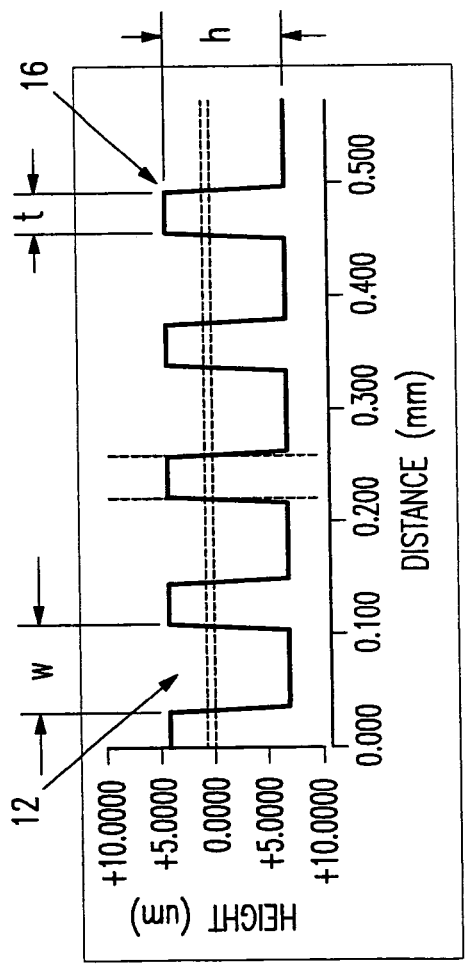

FIG. 4a is an optical profilometry three-dimensional profile of the typical microcups prepared by microembossing. FIG. 4b is an optical microscopic picture showing the openings of the microcups from the top view. FIG. 4c is the optical profilometry vertical cross-section view of a row of microcups showing their depth.

I(b) Preparation of the Microcups by Imagewise Exposure

Alternatively, the microcups may be prepared by imagewise exposure (FIG. 5a) of a radiation curable material (51) coated on the conductor film (52) to UV or other forms of radiation through a mask (50). The conductor film (52) is on a plastic substrate (53).

For a roll-to-roll process, the photomask may be synchronized with the web and move at the same speed as the latter. In the photomask (50) in FIG. 5a, the dark squares (54) represent the opaque area and the space (55) between the dark squares represents the opening area. The UV radiates through the opening area (55) onto the radiation curable material. The exposed areas become hardened and the unexposed areas (protected by the opaque area in the mask) are then removed by an appropriate solvent or developer to form the microcups (56). The solvent or developer is selected from those commonly used for dissolving or reducing the viscosity of radiation curable materials such as methylethylketone, toluene, acetone, isopropanol or the like.

FIGS. 5b and 5c illustrate two other options for the preparation of microcups by imagewise exposure. The features in these two figures are essentially the same as shown in FIG. 5a and the corresponding parts are also numbered the same. In FIG. 5b, the conductor film (52) used is opaque and pre-patterned. In this case, it may be advantageous to imagewise expose the radiation sensitive material through the conductor pattern, which serves as the photomask. The microcups (56) can then be formed by removing the unexposed areas after UV radiation. In FIG. 5c, the conductor film (52) is also opaque and line-patterned. The radiation curable material is exposed from the bottom through the conductor line pattern (52) which serves as the first photomask. A second exposure is performed from the other side through the second photomask (50) having a line pattern perpendicular to the conductor lines. The unexposed area is then removed by a solvent or developer to reveal the microcups (56).

In general, the microcups can be of any shape, and their sizes and shapes may vary. The microcups may be of substantially uniform size and shape in one system. However, in order to maximize the optical effect, microcups having a mixture of different shapes and sizes may be produced. For example, microcups filled with a dispersion of the red color may have a different shape or size from the green microcups or the blue microcups. Furthermore, a pixel may consist of different numbers of microcups of different colors. For example, a pixel may consist of a number of small green microcups, a number of large red microcups, and a number of small blue microcups. It is not necessary to have the same shape and number for the three colors.

The openings of the microcups may be round, square, rectangular, hexagonal, or any other shape. The partition area between the openings is preferably kept small in order to achieve a high color saturation and contrast while maintaining desirable mechanical properties. Consequently, the honeycomb-shaped opening is preferred over, for example, the circular opening.

For reflective electrophoretic displays, the dimension of each individual microcup may be in the range of about $10^2$ to about $1 \times 10^6$ $\mu m^2$, preferably from about $10^3$ to about $1 \times 10^5$ $\mu m^2$. The depth of the microcups is in the range of about 5 to about 200 microns, preferably from about 10 to about 100 microns. The opening to wall ratio is in the range of from about 0.05 to about 0.95, preferably from about 0.4 to about 0.9. The distances of the openings usually are in the range of from about 15 to about 450 microns, preferably from about 25 to about 300 microns from edge to edge of the openings.

II. Preparation of the Suspension/Dispersion

The microcups are filled with charged pigment particles dispersed in a dielectric solvent. The dispersion may be prepared according to methods well known in the art such as U.S. Pat. Nos. 6,017,584, 5,914,806, 5,573,711, 5,403,518, 5,380,362, 4,680,103, 4,285,801, 4,093,534, 4,071,430, 3,668,106 and *IEEE Trans. Electron Devices*, ED-24, 827 (1977), and *J. Appl. Phys.* 49(9), 4820 (1978). The charged pigment particles visually contrast with the medium in which the particles are suspended. The medium is a dielectric solvent which preferably has a low viscosity and a dielectric constant in the range of about 2 to about 30, preferably about 2 to about 15 for high particle mobility. Examples of suitable dielectric solvents include hydrocarbons such as decahydronaphthalene (DECALIN), 5-ethylidene-2-norbornene, fatty oils, paraffin oil, aromatic hydrocarbons such as toluene, xylene, phenylxylylethane, dodecylbenzene and alkylnaphthalene, halogenated solvents such as perfluorodecalin, perfluorotoluene, perfluoroxylene, dichlorobenzotrifluoride, 3,4,5-trichlorobenzotrifluoride, chloropentafluoro-benzene, dichlorononane, pentachlorobenzene, and perfluoro solvents such as FC-43, FC-70 and FC-5060 from 3M Company, St. Paul Minn., low molecular weight halogen containing polymers such as poly(perfluoropropylene oxide) from TCI America, Portland, Oreg., poly(chlorotrifluoroethylene) such as Halocarbon Oils from Halocarbon Product Corp., River Edge, N.J., perfluoropolyalkylether such as Galden from Ausimont or Krytox Oils and Greases K-Fluid Series from DuPont, Del. In one preferred embodiment, poly(chlorotrifluoroethylene) is used as the dielectric solvent. In another preferred embodiment, poly(perfluoropropylene oxide) is used as the dielectric solvent.

The suspending medium may be colored by colorants (i.e., dyes or pigments). Nonionic azo and anthraquinone dyes are particularly useful. Examples of useful dyes include, but are not limited to, Oil Red EGN, Sudan Red, Sudan Blue, Oil Blue, Macrolex Blue, Solvent Blue 35, Pylam Spirit Black and Fast Spirit Black from Pylam Products Co., Arizona, Sudan Black B from Aldrich, Thermoplastic Black X-70 from BASF, anthroquinone blue, anthroquinone yellow 114, anthroquinone red 111, 135, anthroquinone green 28 from Aldrich. In case of an insoluble pigment, the pigment particles for generating the color of the medium may also be dispersed in the dielectric medium. These color particles are preferably uncharged. If the pigment particles for generating color in the medium are charged, they preferably carry a charge which is opposite from that of the charged pigment particles. If both types of pigment particles carry the same charge, then they should have different charge density or different electrophoretic mobility. In any case, the dye or pigment for generating color of the medium must be chemically stable and compatible with other components in the suspension.

The charged pigment particles may be organic or inorganic pigments, such as $TiO_2$, phthalocyanine blue, phthalocyanine green, diarylide yellow, diarylide AAOT yellow, and quinacridone, azo, rhodamine, perylene pigment series from Sun Chemical, Hansa yellow G particles from Kanto Chemical, and Carbon Lampblack from Fisher. Submicron particle size is preferred. The particles should have acceptable optical characteristics, should not be swollen or softened by the dielectric solvent, and should be chemically stable. The resulting suspension must also be stable against sedimentation, creaming or flocculation under normal operating conditions.

The pigment particles may exhibit a native charge, or may be charged explicitly using a charge control agent, or may acquire a charge when suspended in the dielectric solvent. Suitable charge control agents are well known in the art; they may be polymeric or non-polymeric in nature, and may also be ionic or non-ionic, including ionic surfactants such as Aerosol OT, sodium dodecylbenzenesulfonate, metal soap, polybutene succinimide, maleic anhydride copolymers, vinylpyridine copolymers, vinylpyrrolidone copolymer (such as Ganex from International Specialty Products), (meth)acrylic acid copolymers, N,N-dimethylaminoethyl (meth)acrylate copolymers. Fluorosurfactants are particularly useful as charge controlling agents in perfluorocarbon solvents. These include FC fluorosurfactants such as FC-170C, FC-171, FC-176,FC430, FC431 and FC-740 from 3M Company and Zonyl fluorosurfactants such as Zonyl FSA, FSE, FSN, FSN-100, FSO, FSO-100, FSD and UR from Dupont.

Suitable charged pigment dispersions may be manufactured by any of the well-known methods including grinding, milling, attriting, microfluidizing, and ultrasonic techniques. For example, pigment particles in the form of a fine powder are added to the suspending solvent and the resulting mixture is ball milled or attrited for several hours to break up the highly agglomerated dry pigment powder into primary particles. Although less preferred, a dye or pigment for generating color of the suspending medium may be added to the suspension during the ball milling process.

Sedimentation or creaming of the pigment particles may be eliminated by microencapsulating the particles with suitable polymers to match the specific gravity to that of the dielectric solvent. Microencapsulation of the pigment particles may be accomplished chemically or physically. Typical microencapsulation processes include interfacial polymerization, in-situ polymerization, phase separation, coacervation, electrostatic coating, spray drying, fluidized bed coating and solvent evaporation.

For a black/white electrophoretic display, the suspension comprises charged white particles of titanium oxide ($TiO_2$) dispersed in a black solvent or charged black particles dispersed in a dielectric solvent. A black dye or dye mixture such as Pylam Spirit Black and Fast Spirit Black from Pylam Products Co. Arizona, Sudan Black B from Aldrich, Thermoplastic Black X-70 from BASF, or an insoluble black pigment such as carbon black may be used to generate the black color of the solvent. For other colored suspensions, there are many possibilities. For a subtractive color system, the charged $TiO_2$ particles may be suspended in a dielectric solvent of cyan, yellow or magenta color. The cyan, yellow or magenta color may be generated via the use of a dye or a pigment. For an additive color system, the charged $TiO_2$ particles may be suspended in a dielectric solvent of red, green or blue color generated also via the use of a dye or a pigment. The red, green, blue color system is preferred for most applications.

III. Sealing of the Microcups

The sealing of the microcups may be accomplished in a number of ways. A preferred approach is to disperse a UV curable composition into an electrophoretic fluid containing charged pigment particles dispersed in a dielectric solvent. The UV curable composition is immiscible with the dielectric solvent and has a specific gravity no greater than that of the dielectric solvent and the pigment particles. The two components, UV curable composition and the electrophoretic fluid, are thoroughly blended in an in-line mixer and immediately coated onto the microcups with a precision coating mechanism such as Myrad bar, gravure, doctor blade, slot coating or slit coating. Excess fluid is scraped away by a wiper blade or a similar device. A small amount of a weak solvent or solvent mixture such as isopropanol, methanol, or an aqueous solution thereof may be used to clean the residual electrophoretic fluid on the top surface of the partition walls of the microcups. Volatile organic solvents may be used to control the viscosity and coverage of the electrophoretic fluid. The thus-filled microcups are then dried and the UV curable composition floats to the top of the electrophoretic fluid. The microcups may be sealed by curing the supernatant UV curable layer during or after it floats to the top. UV or other forms of radiation such as visible light, IR and electron beam may be used to cure the sealing composition and seal the microcups. Alternatively, heat or moisture may also be employed to cure and seal the microcups, if appropriate heat or moisture curable compositions are used.

The radiation curable composition for sealing may comprise a material selected from the group consisting of polyvalent acrylate or methacrylate, cyanoacrylates, polyvalent vinyl including vinylbenzene, vinylsilane, vinylether, polyvalent epoxide, polyvalent isocyanate, polyvalent allyl, and oligomers or polymers containing crosslinkable functional groups.

Thermoplastic elastomers may be used as the sealing material. Examples of useful thermoplastic elastomers include di-block, tri-block or multi-block copolymers represented by the formulas ABA or (AB)n in which A is styrene, α-methylstyrene, ethylene, propylene or norbonene; B is butadiene, isoprene, ethylene, proplyene, butylene, dimethoylsiloxane or propylene sulfide; and A and B cannot be the same in the formula. The number, n, is $\geq 1$, preferably 1–10. Representative copolymers include poly(styrene-b-butadiene), poly(styrene-b-butadiene-b-styrene), poly(styrene-b-isoprene-b-styrene), poly(styrene-b-ethylene/butylene-b-styrene), poly(styrene-b-dimethylsiloxane-b-styrene), poly((α-methylstyrene-b-isoprene), poly(α-methylstyrene-b-isoprene-b-α-methylstyrene), poly(α-methylstyrene-b-propylene sulfide-b-α-methylstyrene), and poly(α-methylstyrene-b-dimethylsiloxane-b-α-methylstyrene). Additives, such as silica particles and surfactants, may be used to improve the film integrity and coating quality.

A preferred group of dielectric solvents exhibiting desirable density and solubility discrimination against acrylate monomers and oligomers are halogenated hydrocarbons and their derivatives. Surfactants may be used to improve the adhesion and wetting at the interface between the electrophoretic fluid and the sealing materials. Useful surfactants include the FC surfactants from 3M Company, Zonyl fluorosurfactants from DuPont, fluoroacrylates, fluoromethacrylates, fluoro-substituted long chain alcohols, perfluoro-substituted long chain carboxylic acids and their derivatives.

Alternatively, the electrophoretic fluid and the sealing composition may be coated sequentially into the microcups, if the sealing composition is at least partially compatible with the dielectric solvent. Thus, the sealing of the microcups may be accomplished by overcoating a thin layer of the sealing composition which is curable by radiation, heat, moisture or interfacial reaction and curing on the surface of the filled microcups. Interfacial polymerization followed by UV curing is very beneficial to the sealing process. Intermixing between the electrophoretic fluid and the overcoat is significantly suppressed by the formation of a thin barrier layer at the interface by interfacial polymerization. The sealing is then completed by a post curing step, preferably by UV radiation. To further reduce the degree of intermixing, it is highly desirable that the specific gravity of the overcoating is significantly lower than that of the electrophoretic fluid. Volatile organic solvents may be used to adjust the viscosity and the thickness of the coatings. When a volatile solvent is used in the overcoat, it is preferred that it is immiscible with the dielectric solvent. The two-step overcoating process is particularly useful when the dye used is at least partially soluble in the sealing composition.

IV. Preparation of Monochrome Electrophoretic Displays

Figure 6:
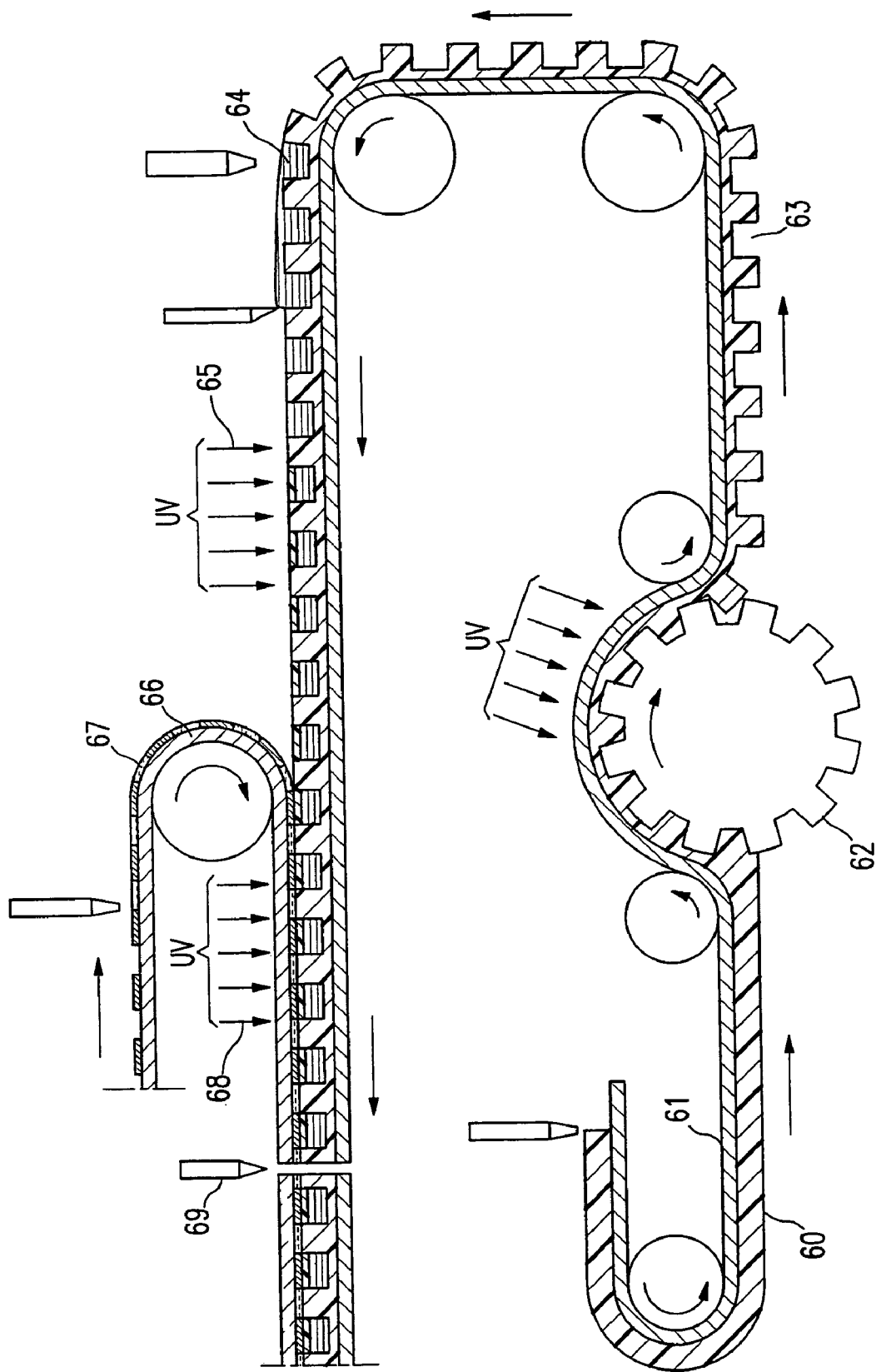
FIG. 6 is a flow chart for manufacturing a black/white electrophoretic display or other single color electrophoretic displays.
Figure 7A:
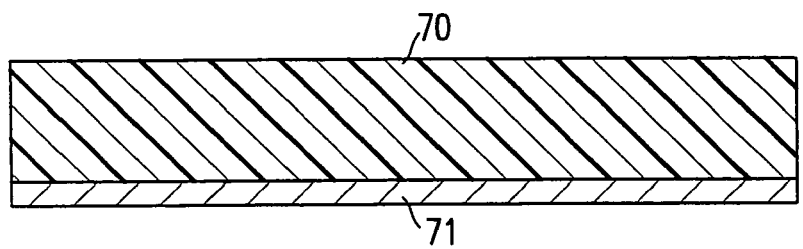
FIGS. 7a–7h illustrate a process for manufacturing a multi-color electrophoretic display.
Figure 7B:
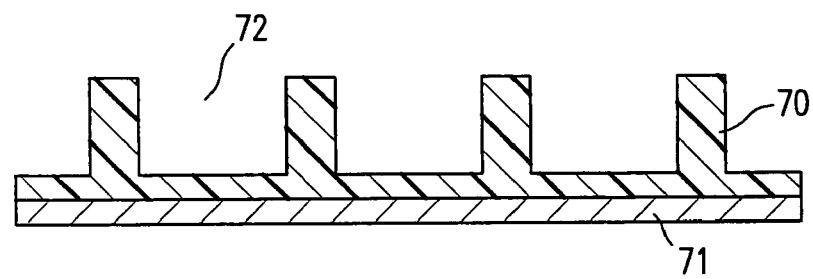
Figure 7C:
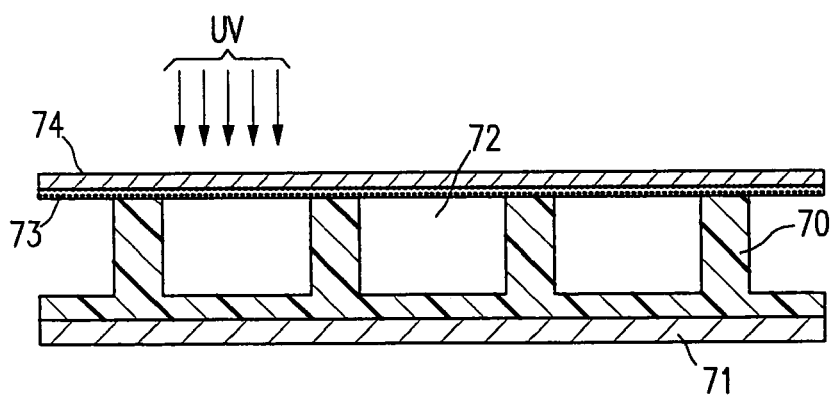
Figure 7D:
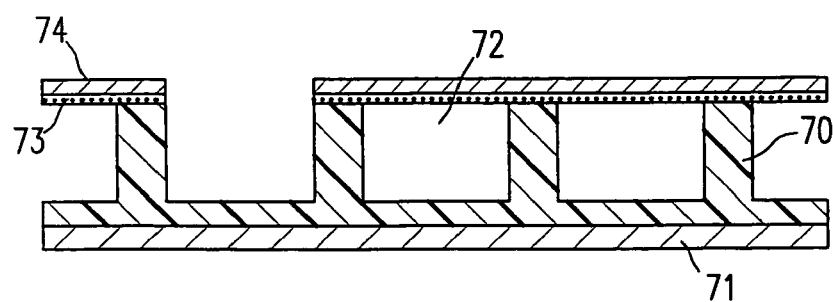
Figure 7E:
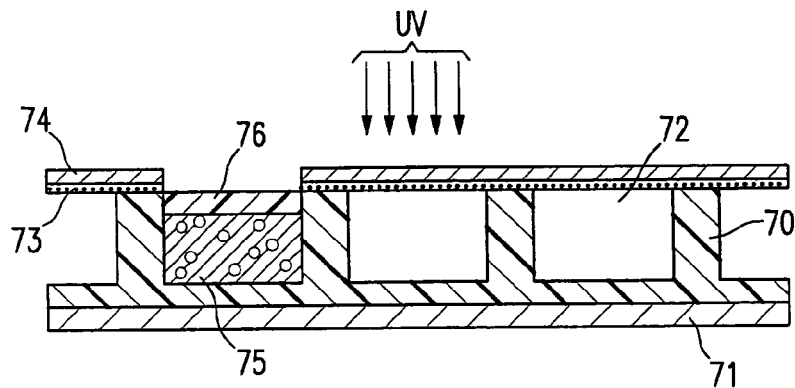
Figure 7F:
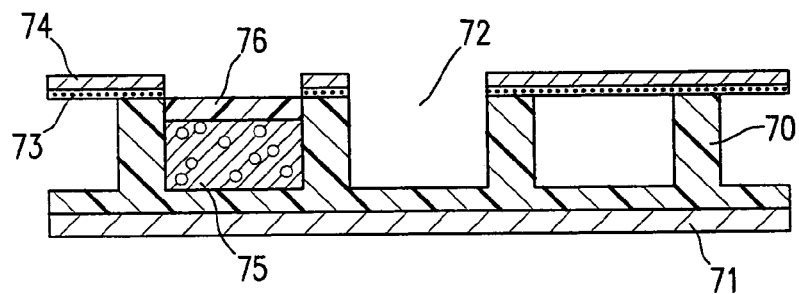
Figure 7G:
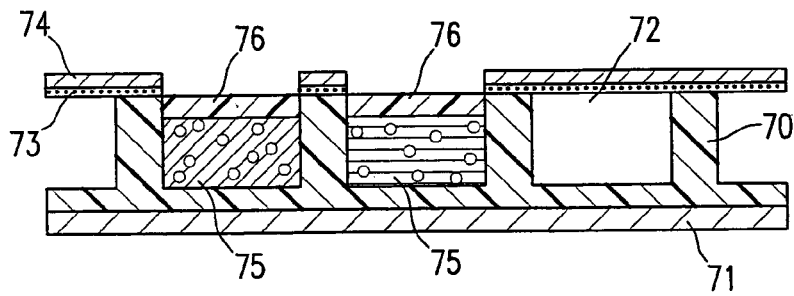
Figure 7H:
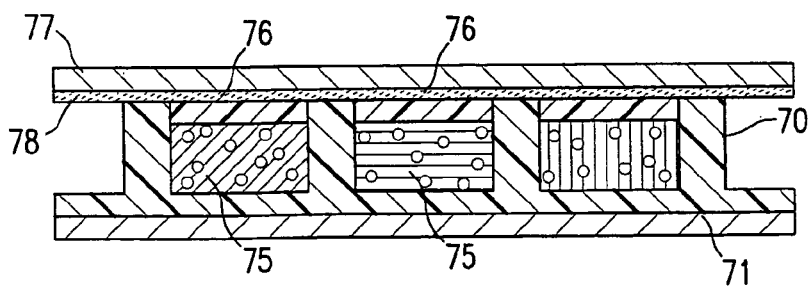

The process is illustrated by the flow diagram as shown in FIG. 6. All microcups are filled with a suspension of the same color composition. The process can be a continuous roll-to-roll process comprising the following steps:

1. Coat a layer of a thermoplastic or thermoset precursor (60) optionally with a solvent on a conductor film (61). The solvent, if present, readily evaporates.
2. Emboss the thermoplastic or thermoset precursor layer at a temperature higher than the glass transition temperature of the thermoplastic or thermoset precursor layer by a pre-patterned male mold (62).
3. Release the mold from the thermoplastic or thermoset precursor layer preferably during or after it is hardened by proper means.
4. Fill in the thus-formed array of microcups (63) with a charged pigment dispersion (64) in a dielectric solvent containing at least a sealing composition which is incompatible with the solvent and has a lower specific gravity than the solvent and the pigment particles.
5. Seal the microcups by curing the sealing composition preferably by radiation such as UV (65), or by heat or moisture during or after the sealing composition separates and forms a supernatant layer on top of the electrophoretic fluid, thus forming closed electrophoretic cells containing a pigment dispersion in a dielectric solvent.
6. Laminate the sealed array of electrophoretic cells with a second conductor film (66) pre-coated with an adhesive layer (67) which may be a pressure sensitive adhesive, a hot melt adhesive, a heat, moisture, or radiation curable adhesive.

The laminate adhesive may be post cured by radiation such as UV (68) through the top conductor film if the latter is transparent to the radiation. The finished product may be cut (69) after the lamination step.

The preparation of the microcups described above can be conveniently replaced by the alternative procedure of imagewise exposing the conductor film coated with a radiation curable material followed by removing the unexposed areas by an appropriate solvent. The sealing of the microcups may alternatively be accomplished by directly overcoating and curing a layer of the sealing composition over the surface of the electrophoretic fluid.

V. Preparation of Multi-Color Electrophoretic Displays

For the manufacture of a multi-color electrophoretic display, additional steps are needed to generate microcups containing suspensions of different colors. These additional steps include (1) laminating the already formed microcups with a positively working dry-film photoresist consisting of at least a removable support such as PET-4851 from Saint-Gobain, Worcester, Mass., a novolac positive photoresist such as Microposit S1818 from Shipley, and an alkali-developable adhesive layer such as a mixture of Nacor 72-8685 from National Starch and Carboset 515 from BF Goodrich; (2) selectively opening a certain amount of the microcups by imagewise exposing the photoresist, removing the removable support film, and developing the positive photoresist with a developer such as diluted Microposit 351 developer from Shipley; (3) filling the opened microcups with an electrophoretic fluid containing charged white pigment ($TiO_2$) particles and dye or pigment of a first color; and (4) sealing the filled microcups as described in Section III above. These additional steps may be repeated to create microcups filled with electrophoretic fluids of second and third colors.

More specifically, a multi-color electrophoretic display may be prepared according to the steps as shown in FIG. 7:

1. Coat a layer of thermoplastic or thermoset precursor (70) on a conductor film (71).
2. Emboss the thermoplastic or thermoset precursor layer at a temperature higher than its glass transition temperature by a pre-patterned male mold (not shown).
3. Release the mold from the thermoplastic or thermoset precursor layer preferably during or after it is hardened by cooling or crosslinking by radiation, heat or moisture.
4. Laminate the thus formed array of microcups (72) with a positive dry-film photoresist which comprises at least an adhesive layer (73), a positive photoresist (74) and a removable plastic cover sheet (not shown).
5. Imagewise expose (FIG. 7c) the positive photoresist by UV, visible light, or other radiation, to remove the cover sheet, develop and open microcups in the exposed area. The purpose of Steps 4 and 5 is to selectively open the microcups in a predetermined area (FIG. 7d).
6. Fill the opened microcups with a charged pigment dispersion (75) in a dielectric solvent containing at least a dye or pigment of a first color and a sealing composition (76) which is incompatible with the dielectric solvent and has a lower specific gravity than the dielectric solvent and the pigment particles.
7. Seal the microcups to form closed electrophoretic cells containing the electrophoretic fluid of the first color by curing the sealing composition (preferably by radiation such as UV, less preferably by heat or moisture) during or after the sealing composition separates and forms a supernatant layer on top of the electrophoretic fluid (FIG. 7e).
8. Steps 5–7 described above may be repeated to generate well-defined cells containing electrophoretic fluids of different colors in different areas (FIGS. 7e, 7f and 7g).
9. Laminate the sealed array of electrophoretic cells in registration to a second, pre-patterned transparent conductor film (77) pre-coated with an adhesive layer (78) which may be a pressure sensitive adhesive, a hot melt adhesive, a heat, moisture, or radiation curable adhesive.
10. Harden the adhesive.

The preparation of the microcups described in the process above can conveniently be replaced by the alternative procedure of imagewise exposing the conductor film coated with a radiation curable material followed by removing the unexposed areas by an appropriate solvent. The sealing of the microcups may be alternatively accomplished by directly coating a layer of the sealing composition over the surface of the electrophoretic fluid.

VI. An Alternative Process for the Preparation of Multi-Color or Full-Color Electrophoretic Displays This alternative process is carried out in multiple steps as illustrated in FIGS. 8a–8e. The process involves filling colorant solutions or dispersions of different colors and charged pigment particles in separate steps. More specifically, the process comprises at least two major steps, (a) pattern-wise filling microcups with colorant solutions or dispersions, and (b) pattern-wise or non-pattern-wise filling an electrophoretic fluid comprising charged pigment particles dispersed in a dielectric solvent or solvent mixture into the microcups. In one embodiment, step (a) is carried out before step (b). In another embodiment, step (b) is carried out before step (a). However, it is preferred that step (a) is carried out before step (b).

The term "pattern-wise" is used to describe a process step which is carried out in a pre-selected area.

The term "non-pattern-wise" is used to describe a process step which is not carried out in a pre-selected area. Usually, a "non-pattern-wise" process step is carried out in a large area or entire area.

Figure 8A:
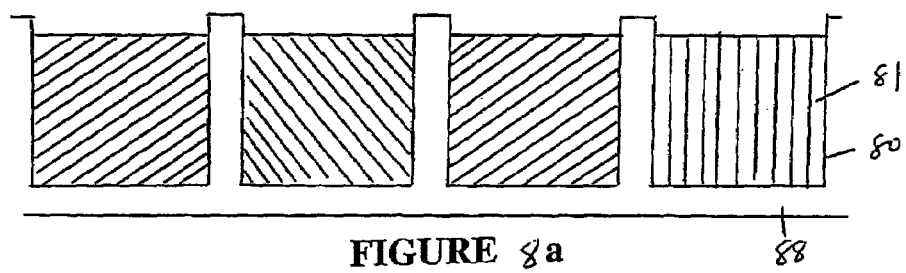
FIGS. 8a–8e illustrate an alternative process for manufacturing a multi-color electrophoretic display.

As shown in FIG. 8a, colorant solutions or dispersions (81) are filled into microcups (80) in different areas. The areas are predetermined. For example, in a certain area, the microcups may be filled with a colorant solution or dispersion of one color and, in another area, the microcups may be filled with a colorant solution or dispersion of another color.

The microcups may be formed on a conductor film (88). There may be an optional primer layer (not shown) between the microcups and the conductor film.

The pattern-wise filling of the colorant solutions or dispersions may be accomplished in a number of ways. For example, the colorant solutions or dispersions of different colors may be directly printed into the microcups in different areas. Suitable printing methods may include, but are not limited to, flexo printing, litho printing, driographic or waterless litho printing, gravure printing, screen printing, thermal printing, laser ablative transfer printing, inkjet printing, strip coating and the like.

Alternatively, the pattern-wise filling of the colorant solutions or dispersions of different colors into the microcups may be carried out by a method similar to that as disclosed in Section V. For example, the method may include laminating or coating all microcups with a positively working photoresist, followed by imagewise exposing the positively working photoresist to open the microcups in a predetermined area and then filling the opened microcups with a colorant solution or dispersion of a first color. These steps may be repeated to fill microcups with colorant solutions or dispersions of different colors in different areas. All of the filled microcups in this case may be sealed in one run after the electrophoretic fluid has been added in.

Another method for filling the microcups with colorant solutions or dispersions of different colors is similar to the one disclosed in a co-pending application, U.S. Ser. No. 10/284,586, filed on Oct. 30, 2002, and U.S. Pat. No. 6,545,797, the contents of both of which are incorporated herein by reference in their entirety. Briefly, the method may involve filling the microcups with a filler material, opening filled microcups in a predetermined area and removing the filler material from the opened microcups and then filling the opened microcups with a colorant solution or dispersion of a first color. These steps may be repeated to fill the microcups in different areas with colorant solutions or dispersions of different colors. All of the filled microcups in this case may be sealed in one run after the electrophoretic fluid has been added in.

The colorant solution or dispersion is prepared by dissolving or dispersing a dye or pigment in a solvent. The solvent may be a dielectric solvent as described above. It may be the same as, or different from, the dielectric solvent used in the electrophoretic fluid. However it is preferred that the solvent is a common solvent, especially a common organic solvent, such as hydrocarbons, alkyl ketones, alkyl esters, alcohols, ethers, water and mixtures thereof. The solvent is preferably volatile so that it may be removed easily. If a common organic solvent is used, the dye or pigment is still preferably soluble or dispersible in the dielectric solvent used in the electrophoretic fluid.

The dye or pigment may be of any color. It may be any of those dyes or pigments disclosed in Section II above. In one embodiment, the colorant solutions or dispersions may be of different colors. In another embodiment, the colorant solutions or dispersions may have the same dye or pigment, but with different optical densities or concentrations, so as to allow different shades of the same color. Therefore in the context of the present application, the term "different colors" would also encompass "different shades of the same color".

Figure 8B:
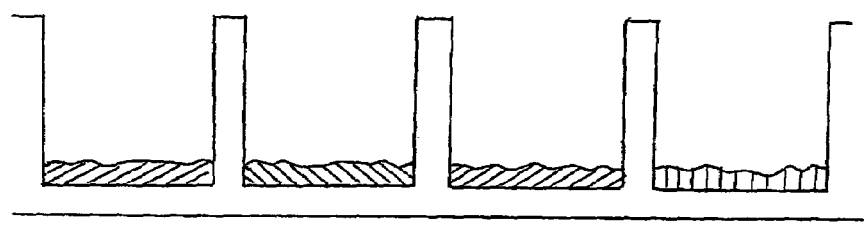

While it is not essential, it is preferred that the solvent is removed after the colorant solutions or dispersions have been filled into the microcups but before the charged pigment particles are introduced. The removal of the solvent may be accomplished by, for example, heat or air flow. FIG. 8b shows that only dried dyes or pigments remain in the microcups.

Figure 8C:
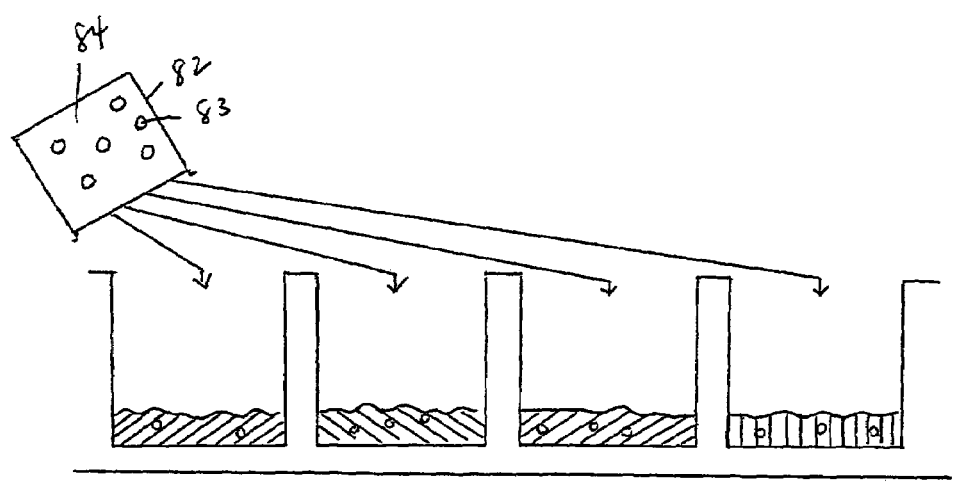
Figure 8D:
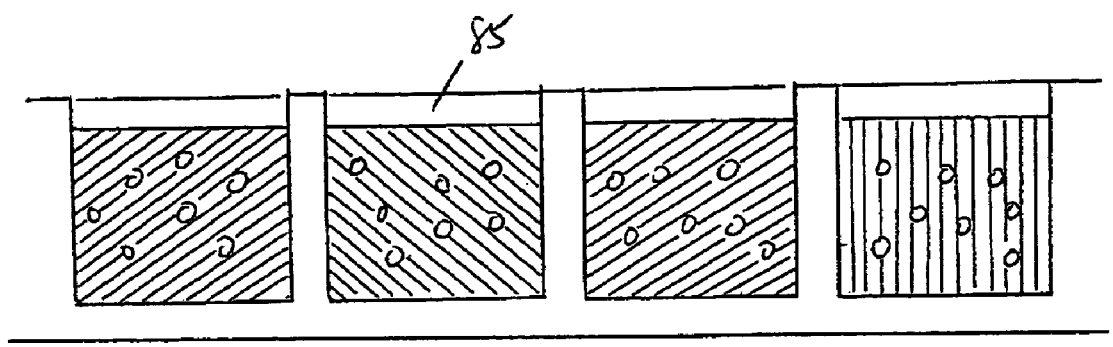
Figure 8E:
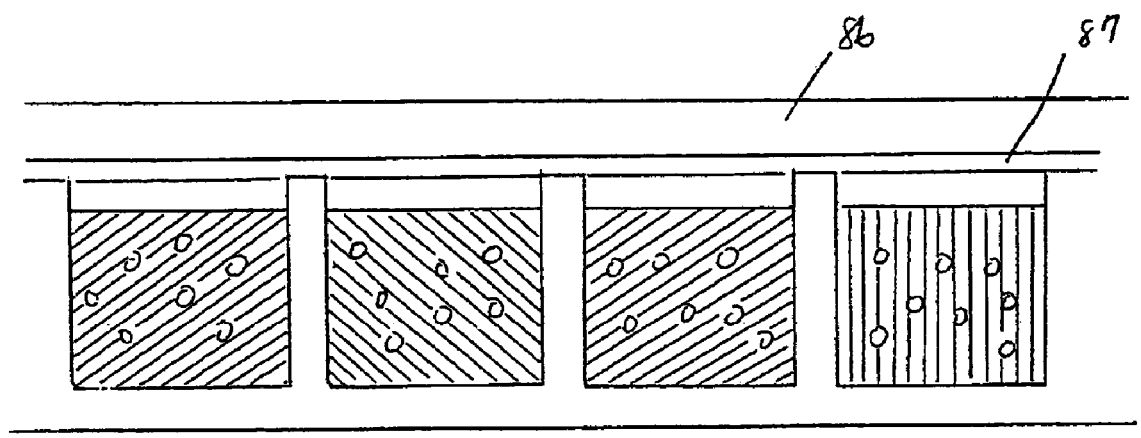

The introduction of the charged pigment particles is accomplished by pattern-wise or non-pattern-wise filling an electrophoretic fluid (82) comprising charged pigment particles (83) dispersed in a dielectric solvent or solvent mixture (84) into the microcups which are already filled with the colorant solutions or dispersions of different colors, as shown in FIG. 8c. The charged pigment particles may be of the same color and the dielectric solvent is preferably clear and colorless. All of the microcups may be filled with an electrophoretic fluid of the same composition.

Preferred dielectric solvents may include, but are not limited to, those described in Section II. The removal of the solvent in the colorant solutions or dispersions before introducing the electrophoretic fluid is preferred and even necessary if the solvent may interfere with the subsequent top-sealing process.

The sealing of the filled microcups may be accomplished by methods as described in Section III above. For example, the sealing may be accomplished by adding a sealing composition into the electrophoretic fluid before filling the electrophoretic fluid into the microcups. The filled microcups are then sealed by curing the supernatant sealing layer (85) during or after it floats to the top of the liquid phase. Heat or radiation such as UV, visible light, IR and electron beam may be used to cure the sealing composition and seal the filled microcups. Alternatively, the sealing may be accomplished by overcoating the sealing composition onto the liquid phase after the electrophoretic fluid has been filled in. The sealing layer (85) may be formed also by hardening of the sealing composition by radiation, heat, moisture or interfacial reaction. The sealing composition used in these methods has a specific gravity no greater than that of the electrophoretic fluid and preferably is immiscible with the electrophoretic fluid. In the present process, all of the filled microcups may be sealed in one run (FIG. 8d) even though the microcups are filled with electrophoretic fluids of different colors.

If step (b) is carried out before step (a), the sealing is then carried out with or after filling of the colorant solutions or dispersions. In this case, the sealing composition has a specific gravity no greater than that of the colorant solutions or dispersions. The sealing composition is preferably immiscible with the colorant solutions or dispersions.

After the microcups are filled and sealed, the sealed microcups may be laminated with a conductor film (86), optionally pre-coated with an adhesive layer (87). The adhesive may be a pressure sensitive adhesive, a hot melt adhesive, a heat, moisture or radiation curable adhesive.

VII. An Alternative Process for the Preparation of Electrophoretic Displays Comprising Microcups of Various Characteristics Electrophoretic displays comprising microcups filled with electrophoretic fluids of different electrophoretic characteristics, such as switching rate, threshold voltage, gamma and/or clearing voltage, may be manufactured by (i) first pattern-wise filling microcups with additive solutions or dispersions providing the various characteristics, followed by (ii) pattern-wise or non-pattern-wise adding an electrophoretic fluid comprising charged pigment (e.g., $TiO_2$ or other white or colored pigments) particles dispersed in a dielectric solvent or solvent into the microcups. The two steps, (i) and (ii), may be carried out in a reversed order.

The microcups may be formed on a conductor film and there may be a primer layer between the conductor film and the microcups.

The pattern-wise filling of the additive solutions or dispersions may be carried out by any of the methods described in Section VI above for the pattern-wise filling of the colorant solutions or dispersions.

The additive solution or dispersion is prepared by dissolving or dispersing an additive in a solvent. Useful additives for the present invention may include, but are not limited to, surfactants, protective colloids, polymers, viscosity modifiers, charge controlling agents, stabilizers, antioxidants, fluorescent materials, fillers and filler particles.

Examples of useful additives may include, but are not limited to, those disclosed in co-pending patent applications, Ser. No. 10/335,210, filed on Dec. 31, 2002, Ser. No. 10/335,051 filed on Dec. 31, 2002, Ser. No. 10/632,171 filed on Jul. 30, 2003, Ser. No. 10/683,869 filed on Oct. 9, 2003, Ser. No. 10/686,501 filed on Oct. 14, 2003, Ser. No. 60/517,520 filed on Nov. 4, 2003 and Ser. No. 60/517,719 filed on Nov. 4, 2003, the contents of all of which are incorporated herein by reference in their entirety.

The solvent may be a dielectric solvent as described above. It may be the same as, or different from, the dielectric solvent used in the electrophoretic fluid. However it is preferred that the solvent is a common solvent, especially a common organic solvent, such as hydrocarbons, alkyl ketones, alkyl esters, alcohols, ethers, water and mixtures thereof. The solvent is preferably volatile so that it may be removed easily. If a common organic solvent is used, the additive is still preferably soluble or dispersible in the dielectric solvent used in the electrophoretic fluid. The concentrations of the additive in the additive solution or dispersion may be adjusted, depending on the needs.

Optionally, the solvent of the additive solutions or dispersions may be dried off before the subsequent step of filling the electrophoretic fluid.

The introduction of the charged pigment particles is accomplished by pattern-wise or non-pattern-wise filling as described in Section VI above an electrophoretic fluid. In this case, the dielectric solvent in which the charged pigment particles are dispersed may be colored.

The thus filled microcups are then top-sealed by one of the sealing processes described in the present application (e.g., Section III and Section VI).

After the microcups are filled and sealed, the sealed microcups may be laminated with a conductor film, optionally pre-coated with an adhesive layer. The adhesive may be a pressure sensitive adhesive, a hot melt adhesive, a heat, moisture or radiation curable adhesive.

If step (ii) is carried out before step (i), the sealing is then carried out with or after filling of the additive solutions or dispersions. In this case, the sealing composition has a specific gravity no greater than that of the additive solutions or dispersions. The sealing composition is preferably immiscible with the additive solutions or dispersions.

For ease of illustration, the term "microcup" is used; however, it is understood that the processes of Sections VI and VII are not limited to the microcup technology. The processes may be applied to other technology for the manufacture of electrophoretic displays. Therefore the term "microcup" broadly encompasses display cells of all types.

The thickness of the display produced by the present processes as described can be as thin as a piece of paper. The width of the display is the width of the coating web (typically 3–90 inches). The length of the display can be anywhere from inches to thousands of feet depending on the size of the roll.

EXAMPLES

The following examples are given to enable those skilled in the art to more clearly understand and to practice the present invention. They should not be considered as limiting the scope of the invention, but merely as being illustrative and representative thereof.

Example 1

Preparation of Microcups by Microembossing

The composition shown in Table 1 is coated onto Mylar J101/200 gauge using a Nickel Chrome bird type film applicator with an opening of 3 mil. The solvent is allowed to evaporate leaving behind a tacky film with a Tg below room temperature.

TABLE 1

PMMA-containing composition for microembossing

| No. | Description | Ingredient | Supplier | Wt % |
|---|---|---|---|---|
| 1 | Epoxy acrylate | Ebecryl 3605 | UCB Chemicals | 7.35 |
| 2 | Monomer | Sartomer SR205 | Sartomer | 9.59 |
| 3 | Urethane acrylate | Ebecryl 6700 | UCB Chemicals | 4.87 |
| 4 | Polymethyl-methacrylate | Elvacite 2051 | ICI | 9.11 |
| 5 | Photoinitiator | Darocur 1173 | Ciba | 1.45 |
| 6 | Cationic photoinitiator | Cyracure UVI 6976 | Union Carbide | 0.60 |
| 7 | Solvent | Acetone | Aldrich | 67.03 |
| | | | Total | 100.00 |

A pre-patterned stencil from Photo Stencil, Colorado Springs, Colo., was used as the male mold for microembossing and Frekote 700-NC from Henkel was used as the mold release. The coated film was then embossed by the stencil using a pressure roller at room temperature. The coating was then UV cured for about 20 minutes through the Mylar film using a Loctite Zeta 7410 exposure unit equipped with a metal fluoride lamp with an intensity of 80 mW/cm$^2$ at 365 nm. The embossed film was then released from the mold to reveal well-defined microcups having lateral dimensions ranging from 60 µm to 120 µm (200–400 dpi) and a depth ranging from 5 µm to 30 µm as measured by optical profilometry and microscope (FIGS. 4a–4c).

Example 2

A composition containing solid oligomer, monomer and additive is shown in Table 2. The glass transition temperature of the mixture was again below room temperature. The tacky coating was deposited on top of Mylar J101/200 gauge as before. Embossing was conducted at 32° C. and 60° C. using a heated pressure roller or laminator. Well-defined high-resolution microcups (100–400 dpi) with depth ranging from 5–30 microns were produced.

TABLE 2

Embossing composition containing oligomer, monomer, additive and solvent

| No. | Description | Ingredient | Supplier | Wt % |
|---|---|---|---|---|
| 1 | Epoxy acrylate | Ebecryl 3903 | UCB Chemicals | 17.21 |
| 2 | Monomer | HDODA | UCB Chemicals | 8.61 |
| 3 | Urethane acrylate | Ebecryl 4827 | UCB Chemicals | 2.87 |
| 4 | Photoinitiator | Irgacure 500 | Ciba | 1.43 |
| 5 | Slip | Ebecryl 1360 | UCB Chemicals | 1.60 |
| 6 | Solvent | Acetone | Aldrich | 68.26 |
| | | | Total | 100 |

Example 3

Preparation of Pigment Dispersion in Dielectric Solvent

Polystyrene (0.89 grams, Polysciences, Inc., mw. 50,000) and AOT (0.094 grams, American Cyanamide, sodium dioctylsulfosuccinate) were dissolved in 17.77 grams of hot xylene (Aldrich). Ti-Pure R-706 (6.25 grams) was added to the solution and ground in an attritor at 200 rpm for more than 12 hours. A low viscosity, stable dispersion was obtained. Oil-blue N (0.25 grams, Aldrich) was added to color the dispersion. The suspension was then tested in a standard electrophoretic cell comprising two ITO conductor plates separated by a 24 micron spacer. High contrast, alternating white and blue images were observed with a switching rate of about 60 Hz and a rising time of 8.5 msec at 80 volts.

Example 4

The experiment of Example 3 was repeated, except Oil Red EGN (Aldrich) and an electrophoretic cell with a 24 micron spacer were used. High contrast, alternating red and white images were observed with a switching rate of 60 Hz and a rising time of 12 msec at 60 volts.

Example 5

Ti-Pure R-706 (112 grams) was ground by an attritor in a solution containing 11.2 grams of a maleic anhydride copolymer (Baker Hughes X-5231), 24 grams of 3,4-dichlorobenzotrifluoride, and 24 grams of 1,6-dichlorohexane (both from Aldrich). Similarly, 12 grams of carbon black were ground in a solution containing 1.2 grams of alkylated polyvinylpyrrolidone (Ganex V216 from ISP), 34 grams of 3,4-dichlorobenzotrifluoride, and 34 grams of 1,6-dichlorohexane (Aldrich) at 100° C. These two dispersions were then mixed homogeneously and tested. High contrast black and white images were observed with a switching rate up to 10 Hz and a rising time of about 36 msec at 100 volts.

Example 6

Sealing the Microcups by One-step Process 0.05 Milliliter of a UV curable composition comprising 1 wt % of benzil dimethyl ketal (Esacure KB1 from Sartomer) in HDDA (1,6-hexanediol diacrylate from Aldrich) were dispersed into 0.4 ml of a dielectric solvent comprising 0.5 wt % of 2,2,3,3,4,4,5,5,6,6,7,7,8,8,9,9,10,10,10-nonadecafluoro-1-decanol (Aldrich) in FC-43 from 3M Company. The resultant dispersion was then immediately filled into an array of microcups as prepared in Example 2. Excess of fluid was scrapped away by a wiper blade. The HDDA solution was allowed to phase separate for at least 30 seconds and cured by UV radiation (10 mw/cm$^2$) for about 1 minute. A hard, clear layer was observed on the top of the microcups and the microcups were sealed.

Example 7

Sealing the Microcups by a Two-step (Overcoating and UV Curing) Process

The electrophoretic fluid prepared in Example 5 was coated onto the microcup array as prepared in Example 2. A thin layer of Norland optical adhesive NOA 60 (Norland Products Inc., New Brunswick, N.J.) was coated onto the filled microcups. Any excess of the UV adhesive was scrapped off by a strip of Mylar film and cleaned by a piece of absorbing paper. The overcoated adhesive was then cured immediately under a Loctite Zeta 7410 UV exposure unit for about 15 minutes. The microcups were sealed completely and no air pocket was observed. The thickness of cured adhesive layer was about 5–10 microns as measured by a Mitutoyo thickness gauge.

Example 8

Sealing the Microcups by a Two-step (Overcoating and Moisture Curing) Process

The experiment of Example 7 was repeated, except the Norland adhesive was replaced by Instant Krazy glue from Elmer's Products, Inc., Columbus, Ohio. The overcoated adhesive was then cured for 5 minutes by moisture in air. The microcups were sealed completely and no air pocket was observed. The thickness of cured adhesive layer was about 5–10 microns as measured by a Mitutoyo thickness gauge.

Example 9

Sealing the Microcups by a Two-step (Overcoating and Interfacial Polymerization) Process The experiment of Example 8 was repeated, except the electrophoretic fluid was replaced by a 3,4-dichlorobenzotrifluoride solution containing 0.3 wt % of tetraethylenepentaamine (Aldrich) and the Instant Krazy glue was replaced by an aliphatic polyisocyanate (Desmodur N 3300 from Bayer Corp.) solution in anhydrous ether. A highly crosslinked thin film was observed almost immediately after overcoating. The dielectric solvent was completely sealed inside the microcups after ether was evaporated at room temperature. No air pocket was observed.

While the present invention has been described with reference to the specific embodiments thereof, it should be understood by those skilled in the art, that various changes may be made and equivalents may be substituted without departing from the true spirit and scope of the invention. In addition, many modifications may be made to adapt a particular situation, materials, compositions, processes, process step or steps, to the objective, spirit and scope of the present invention. All such modifications are intended to be within the scope of the claims appended hereto.

What is claimed is:

1. A process for the manufacture of a multi-color electrophoretic display, which process comprises the steps of:
    (a) pattern-wise filling microcups with colorant solutions or dispersions, each of said colorant solutions or dispersions comprising a colorant dissolved or dispersed in a first solvent,
    (b) removing said first solvent in said colorant solutions or dispersions to form colorant-containing microcups, and
    (c) non-pattern-wise filling said colorant-containing microcups with an electrophoretic fluid comprising charged pigment particles dispersed in a dielectric solvent or solvent mixture in which said colorants are soluble or dispersible.

2. The process of claim 1 wherein the pattern-wise filling of the colorant solutions or dispersions is carried out by a printing method.

3. The process of claim 2 wherein said printing method is flexo printing, litho printing, driographic or waterless litho printing, gravure printing, screen printing, thermal printing, laser ablative transfer printing, inkjet printing or strip coating.

4. The process of claim 1 wherein said pattern-wise filling of the colorant solutions or dispersions is carried out by laminating or coating onto said microcups a positively working photoresist, selectively opening said microcups in a predetermined area and filling the opened microcups with a colorant solution or dispersion of a predetermined color.

5. The process of claim 1 wherein said pattern-wise filling of the colorant solutions or dispersions is carried out by filling said microcups with a filler material, selectively opening the filled microcups in a predetermined area, removing the filler material from the opened microcups and filling the opened microcups with a colorant solution or dispersion of a predetermined color.

6. The process of claim 1 wherein said first solvent is a dielectric solvent.

7. The process of claim 1 wherein said first solvent is a common organic solvent.

8. The process of claim 7 wherein said common organic solvent is selected from the group consisting of hydrocarbons, alkyl ketones, alkyl esters, alcohols, ethers, water and mixtures thereof.

9. The process of claim 1 wherein said colorant solutions or dispersions are of different colors.

10. The process of claim 1 wherein said colorant solutions or dispersions are of the same color but having different optical densities or concentrations.

11. The process of claim 1 wherein said charged pigment particles are of the same color dispersed in a clear and colorless dielectric solvent.

12. The process of claim 1 further comprising top sealing of the filled microcups with a sealing composition having a specific gravity no greater than that of the electrophoretic fluid.

13. The process of claim 12 wherein said top sealing is accomplished by filling the sealing composition and the electrophoretic fluid together into the colorant-containing microcups and hardening the sealing composition during or after it floats to the top of the electrophoretic fluid.

14. The process of claim 13 wherein the hardening of the sealing composition is accomplished by radiation or heat.

15. The process of claim 12 wherein said top sealing is accomplished by overcoating the sealing composition onto said electrophoretic fluid and hardening the sealing composition.

16. The process of claim 15 wherein the hardening of the sealing composition is accomplished by radiation or heat.

17. The process of claim 12 further comprising laminating a conductor film over the filled and sealed microcups optionally with an adhesive layer.

18. The process of claim 1 wherein said solvent is dried off in step (b).

19. A process for the manufacture of an electrophoretic display comprising microcups filled with electrophoretic fluids having different electrophoretic characteristics, which process comprises the steps of:
(a) pattern-wise filling microcups with additive solutions or dispersions of different electrophoretic characteristics, each of said additive solutions or dispersions comprising an additive dissolved or dispersed in a first solvent,
(b) removing said first solvent in said additive solutions or dispersions to form additive-containing microcups, and
(c) non-pattern-wise filling said additive-containing microcups with an electrophoretic fluid comprising charged pigment particles dispersed in a dielectric solvent or solvent mixture in which said additives are soluble or dispersible.

20. The process of claim 19 wherein the pattern-wise filling of the additive solutions or dispersions is carried out by a printing method.

21. The process of claim 20 wherein said printing method is flexo printing, litho printing, driographic or waterless litho printing, gravure printing, screen printing, thermal printing, laser ablative transfer printing, inkjet printing or strip coating.

22. The process of claim 19 wherein said pattern-wise filling of the additive solutions or dispersions is carried out by laminating or coating onto said microcups a positively working photoresist, selectively opening said microcups in a predetermined area and filling the opened microcups with an additive solution or dispersion of a predetermined electrophoretic characteristic.

23. The process of claim 19 wherein said pattern-wise filling of the additive solutions or dispersions is carried out by filling said microcups with a filler material, selectively opening the filled microcups in a predetermined area, removing the filler material from the opened microcups and filling the opened microcups with an additive solution or dispersion of a predetermined electrophoretic characteristic.

24. The process of claim 19 wherein said additive is a surfactant, protective colloid, polymer, viscosity modifier, charge controlling agent, stabilizer, antioxidant, fluorescent material, filler or filler particles.

25. The process of claim 19 wherein said first solvent is a dielectric solvent.

26. The process of claim 19 wherein said first solvent is a common organic solvent.

27. The process of claim 26 wherein said common organic solvent is selected from the group consisting of hydrocarbons, alkyl ketones, alkyl esters, alcohols, ethers, water and mixtures thereof.

28. The process of claim 19 wherein said charged pigment particles are dispersed in a colored dielectric solvent.

29. The process of claim 19 further comprising top sealing of the filled microcups with a sealing composition having a specific gravity no greater than that of the electrophoretic fluid.

30. The process of claim 29 wherein said top sealing is accomplished by filling the sealing composition and the electrophoretic fluid together into the additives-containing microcups and hardening the sealing composition during or after it floats to the top of the electrophoretic fluid.

31. The process of claim 30 wherein the hardening of the sealing composition is accomplished by radiation or heat.

32. The process of claim 29 wherein said top sealing is accomplished by overcoating the sealing composition onto said electrophoretic fluid and hardening the sealing composition.

33. The process of claim 32 wherein the hardening of the sealing composition is accomplished by radiation or heat.

34. The process of claim 29 further comprising laminating a conductor film over the filled and sealed microcups optionally with an adhesive layer.

35. The process of claim 19 wherein said solvent is dried off in step (b).

* * * * *